US012756477B2

(12) United States Patent
Chen et al.

(10) Patent No.: US 12,756,477 B2
(45) Date of Patent: Oct. 6, 2026

(54) FREQUENCY COMB-BASED ANALOG COHERENT RECEIVER FOR MULTI-WAVELENGTH OPTICAL LINKS

(71) Applicants: The Board of Trustees of the Leland Stanford Junior University, Stanford, CA (US); The Regents of the University of California, Oakland, CA (US)

(72) Inventors: Elizabeth Chen, Stanford, CA (US); Joseph M. Kahn, San Carlos, CA (US); Brandon Buscaino, Yorba Linda, CA (US); Larry A. Coldren, Santa Barbara, CA (US)

(73) Assignees: The Board of Trustees of the Leland Stanford Junior University, Stanford, CA (US); The Regents of the University of California, Oakland, CA (US)

( * ) Notice: Subject to any disclaimer, the term of this patent is extended or adjusted under 35 U.S.C. 154(b) by 206 days.

(21) Appl. No.: 18/838,179

(22) PCT Filed: Feb. 14, 2023

(86) PCT No.: PCT/US2023/013036

§ 371 (c)(1),
(2) Date: Aug. 13, 2024

(87) PCT Pub. No.: WO2023/154569

PCT Pub. Date: Aug. 17, 2023

(65) Prior Publication Data

US 2025/0158720 A1 May 15, 2025

Related U.S. Application Data

(60) Provisional application No. 63/310,016, filed on Feb. 14, 2022.

(51) Int. Cl.
*H04B 10/61* (2013.01)
*H04B 10/63* (2013.01)

(52) U.S. Cl.
CPC .......... *H04B 10/615* (2013.01); *H04B 10/63* (2013.01)

(58) Field of Classification Search
CPC .............................. H04B 10/615; H04B 10/63
(Continued)

(56) References Cited

U.S. PATENT DOCUMENTS 11,218,224 B2 1/2022 Perin
2015/0139640 A1 5/2015 Jopson
(Continued)

FOREIGN PATENT DOCUMENTS

WO WO2019185128 10/2019

OTHER PUBLICATIONS

Bordonalli et al. "Optical injection locking to optical frequency combs for superchannel coherent detection", 2015, Optics Express vol. 23, No. 2 pp. 1547-1557.
(Continued)

*Primary Examiner* — Kenneth N Vanderpuye
(74) *Attorney, Agent, or Firm* — LUMEN PATENT FIRM

(57) ABSTRACT

Coherent wavelength division multiplexing is provided using frequency comb sources for both the transmitter and the local oscillator (LO) in the receiver. The local oscillator is made phase coherent with the received multifrequency optical signal using two analog control loops. One of the control loops locks an optical frequency of the local oscillator to an optical frequency of the received frequency comb. The other control loop locks a microwave frequency of the local oscillator (i. e. LO the comb spacing) to the comb spacing of the received frequency comb. As a result, coherent detection is enabled in all channels with just two analog
(Continued)

control loops. Control signals for the two loops can be derived from two of the received channels individually (asymmetric carrier recovery), or they can be derived from sum and difference signals from two of the received channels (symmetric carrier recovery).

14 Claims, 15 Drawing Sheets

(58) Field of Classification Search
USPC ........................................................ 398/204
See application file for complete search history.

(56) References Cited

U.S. PATENT DOCUMENTS

2017/0033870 A1* 2/2017 Dangui et al. ......... H04B 10/40
2018/0083599 A1* 3/2018 Kippenberg et al. ........................ H03H 3/0072

OTHER PUBLICATIONS

Lundberg et al., "Frequency Comb-Based WDM Transmission Systems Enabling Joint Signal Processing", 2018, Appl. Sci. v8, 718.

* cited by examiner

*Table I. Loss, gain and power values for exemplary MLL comb-based system.*

| | |
|---|---|
| Laser-to-PIC coupling loss, DI IL, and FF IL ($\eta_1$, $\eta_{1,LO}$) | 5.5 dB |
| Tx (de-)multiplexing, and DP-IQ modulation loss ($\eta_2$) | 8 dB |
| LO de-multiplexing, and downconversion loss ($\eta_{2,LO}$) | 7.5 dB |
| Channel loss ($\eta_3$) | 10 dB |
| Rx de-multiplexing, polarization controller, and downconversion loss ($\eta_4$) | 10 dB |
| Booster amplifier 1 gain ($G_1$) | 20 dB |
| LO booster amplifier gain ($G_{LO}$) | 14 dB |
| Booster amplifier noise figure ($F_{n,1}$, $F_{n,LO}$) | 7 dB |
| Lowest Tx MLL output comb line | -6 dBm |
| Lowest LO MLL output comb line | 0 dBm |

FIG. 11

*Table II. Comparison of MLL and RE-EO Combs for WDM Analog Coherent Links*

| Comb Type | Span | Material | Optical Linewidth | Power Consumption |
|---|---|---|---|---|
| MLL | About 1 THz | III-V semiconductor | Hundreds of kHz to MHz | 32.3 (8.4) W |
| RE-EO | More than 1 THz | TFLN | Follows seed laser | 37.3 (13.4) W |

FIG. 12

*Table III. Power Consumption Summary (all values are in units of W)*

| Source | Tx Optics | Rx Optics | Tx Optics Cooling | Rx Optics Cooling | Tx Electronics | Rx Electronics | Total |
|---|---|---|---|---|---|---|---|
| MLL Comb | 0.7 | 0.8 | 0.7 | 0.8 | 24.1 (0.2) | 5.2 | 32.3 (8.4) |
| RE-EO Comb | 0.8 | 1.4 | 0.8 | 1.4 | 25.9 (2.0) | 7.0 | 37.3 (13.4) |
| Laser Array | 0.4 | 0.4 | 0.4 | 0.4 | 23.9 (0.0) | 9.1 | 34.6 (10.7) |

FIG. 13

*Table IV. Tx Optics Power Tracking*

| Element | Source | Input Optical Power (mW) | Input Electrical Power (mW) | Output Optical Power (mW) |
|---|---|---|---|---|
| | MLL Comb | 0 | 62 | 9.3 |
| Laser ($\eta_{laser}$=15%) | RE-EO Comb | 0 | 210 | 31 |
| | Laser Array | 0 | 430 | 65 |
| SOA ($G_1 = 20$ dB; $\eta_{SOA}$=15%) | MLL Comb | 0.9 | 610 | 92 |
| | RE-EO Comb | 0.9 | 610 | 92 |
| | Laser Array | N/A | N/A | N/A |
| | MLL Comb | | 670 | |
| Total | RE-EO Comb | | 820 | |
| | Laser Array | | 430 | |

FIG. 14

*Table V. Rx Optics Power Tracking*

| Element | Source | Input Optical Power (mW) | Input Electrical Power (mW) | Output Optical Power (mW) |
|---|---|---|---|---|
| | MLL Comb | 0 | 250 | 37 |
| Laser ($\eta_{laser}$=15%) | RE-EO Comb | 0 | 820 | 120 |
| | Laser Array | 0 | 430 | 65 |
| SOA ($G_{LO}$=14 dB; $\eta_{SOA}$=15%) | MLL Comb | 3.7 | 590 | 92 |
| | RE-EO Comb | 3.7 | 590 | 92 |
| | Laser Array | N/A | N/A | N/A |
| | MLL Comb | | 840 | |
| Total | RE-EO Comb | | 1400 | |
| | Laser Array | | 430 | |

FIG. 15

*Table VI. Tx Electronics Power Tracking*

| Element | Source | Power Consumed (W) |
|---|---|---|
| Comb Modulation | MLL Comb | 0.20 |
| | RE-EO Comb | 2 |
| | Laser Array | N/A |
| Data Modulation | MLL Comb | 23.9 |
| | RE-EO Comb | 23.9 |
| | Laser Array | 23.9 |
| | MLL Comb | 24.1 |
| Total | RE-EO Comb | 25.9 |
| | Laser Array | 23.9 |

FIG. 16

*Table VII. Rx Electronics Power Tracking*

| Element | Source | Power Consumed (W) |
|---|---|---|
| Comb Modulation | MLL Comb | 0.20 |
| | RE-EO Comb | 2 |
| | Laser Array | N/A |
| Receiver Chip | MLL Comb | 5.0 |
| | RE-EO Comb | 5.0 |
| | Laser Array | 9.1 |
| | MLL Comb | 5.2 |
| Total | RE-EO Comb | 7.0 |
| | Laser Array | 9.1 |

FIG. 17

FREQUENCY COMB-BASED ANALOG COHERENT RECEIVER FOR MULTI-WAVELENGTH OPTICAL LINKS

CROSS-REFERENCE TO RELATED APPLICATIONS

This application is a 371 of PCT application PCT/US2023/013036 filed Feb. 14, 2023. PCT application PCT/US2023/013036 claims the benefit of U.S. Provisional application 63/310,016 filed Feb. 14, 2022.

FIELD OF THE INVENTION

This invention relates to receivers for coherent wavelength-division multiplexing based on frequency-comb sources.

BACKGROUND

Data center optical communication links face a need for increased bandwidth as technology evolves. Two approaches for increasing bandwidth are use of coherent detection and use of wavelength division multiplexing (WDM), and these two approaches have been combined in practice, especially in connection with long-haul links where maximizing the bandwidth provided by already-installed optical fiber infrastructure is of paramount importance. In the long-haul setting, straightforward combinations of WDM and coherent detection, such as independent carrier recovery for each WDM channel and/or dealing with polarization issues with digital signal processing (DSP) can be viable because the resulting hardware cost and power consumption is negligible compared to the cost of providing more long-haul optical fiber capacity.

However, data center links face more stringent requirements on cost, complexity and/or power consumption. Accordingly, it would be an advance in the art to provide coherent WDM optical links having reduced power consumption (and reduced complexity) compared to conventional coherent WDM architectures.

SUMMARY

FIG. 1 schematically shows the main concept of the present work. Here 102 is a schematic output spectrum of an optical frequency comb source (acting as the transmitter), having several equally spaced optical carrier frequencies that are phase-coherent with each other. The key parameters of the transmitter frequency comb are $f_{oTx}$ and $f_{mTx}$, the optical and microwave frequencies that define the transmitter comb. Two parameters suffice here because of the phase coherence of a frequency comb. Here an "optical frequency comb source" is any optical source that emits at three or more distinct channels having equally spaced frequencies, where the optical carriers of all channels are phase-coherent with each other. Examples of frequency comb sources include, but are not limited to: mode locked lasers and electro-optic comb generators. We define the "optical" part of the electromagnetic spectrum to be the free space wavelength range from 400 nm to 2 μm.

On FIG. 1, 114 is a simplified diagram of the general receiver architecture. Any two of the incoming channels are designated as selected channels 1 and 2. For selected channels 1 and 2, polarization control 104 is followed by homodyne detection 108 and feedback control 110. In particular, feedback control 110 has two analog receiver feedback loops that lock the optical and microwave frequencies ($f_{oRx}$ and $f_{mRx}$, respectively) of a frequency comb local oscillator (LO) to the corresponding parameters from the transmitter. As seen in the detailed examples below, control signals for these loops can come individually from the selected channels, or combination signals (e.g., sum and difference signals) can be used. Once the LO is properly locked, then timing recovery and data detection 112 can be performed.

For all other channels, no per-channel carrier recovery is needed. Instead, received signals in these channels pass through polarization+static phase control units 106 before homodyne detection 108. After this detection, we have timing recovery and data detection 112.

An analog phase control loop is any feedback control system including electronics where the system variable under feedback control is a phase of a signal. Examples of analog phase control loops include, but are not limited to: optical phase locked loops where the phase of an optical laser is under feedback control, and optical phase locked loops where the frequency spacing of an optical frequency comb is under feedback control. Here we define "optical phase locked loop" as any phase locked loop where the phase under control is an optical phase. Note that a phase locked loop (of any kind) has electrical feedback signals, so optical injection locking and the like are not examples of an optical PLL. As considered herein, phase control entails frequency control, since two signals with independently drifting frequencies cannot be phase locked to each other. As such, we often equivalently describe the frequency of a signal as being under feedback control. A "control signal" of a feedback control loop is the signal that is observed by the loop and driven to a fixed value (often zero) when the loop is closed and properly operating. Phase error is a typical example of a control signal. A "control input" of a feedback control loop is the signal that is provided to the device under control by the loop in order to control the device. Tuning inputs are common control inputs.

Accordingly, an exemplary embodiment of the invention is a coherent optical receiver comprising:

- a local oscillator (LO) that is an optical frequency comb source having three or more distinct receive channels, where the receive channels of the LO correspond to transmit channels from a transmitter optical frequency comb source;
- a first analog phase control loop configured to lock an LO optical frequency fox to an optical frequency $f_{oTx}$ of the transmitter optical frequency source;
- a second analog phase control loop configured to lock an LO comb spacing frequency $f_{mRx}$ to a comb spacing frequency $f_{mTx}$ of the transmitter optical frequency comb source.

Here control signals for the first and second analog phase control loops are derived from a first selected receive channel and a second selected receive channel, and detection of each transmit channel is coherent homodyne detection using the corresponding receive channel of the LO.

The first and second selected receive channels provide first and second phase error signals respectively. There are several alternatives for the control architecture.

1) The control signal for the first analog phase control loop can be the first phase error signal, and the control signal for the second analog phase control loop can be the second phase error signal. I.e., in this case, each selected receive channel provides one of the loop control signals. This is the asymmetric case of the detailed examples below.

2) The control signal for the first analog phase control loop can include a weighted sum of the first phase error signal and the second phase error signal, and the control signal for the second analog phase control loop can include a difference of the first phase error signal and the second phase error signal. Alternative 2 is an instance of the symmetric case described in detail below.

There are various ways to choose the first and second selected receive channels and obtain phase error signals indicative of only optical and microwave phase errors. When the two selected channels are not symmetric, we can obtain these error signals by appropriately scaling the phase errors obtained in the two select channels and then taking the sum and the difference of signals as needed to isolate the optical and microwave phase errors. For example, consider an "alternative" asymmetric scheme in which we detect phase errors in channels p1 and −p2, where neither p1 nor p2 is zero (note that the index p2 can be positive or negative, as can p1). If we scale the measured phase errors by 1/p1 and 1/p2, respectively, and add the scaled phase errors, we obtain a signal indicative of only optical phase error. If we take the difference between the two original phase error signals, we obtain a signal indicative of only microwave phase error.

The first and second selected receive channels can have frequencies that are symmetrically positioned in a frequency range of the receive channels. This is especially preferred in cases where the symmetric control scheme is employed.

The receiver can further include a polarization controller corresponding to each receive channel. Preferably the first and second selected receive channels have type-A polarization controllers configured to compensate for polarization changes, and all other receive channels have type-B polarization controllers configured to compensate for both polarization changes and static phase shifts. Preferably, the polarization controllers are disposed in signal paths of the coherent optical receiver, so that time delay in the polarization controllers does not contribute to loop delays in the first and second analog control loops.

The local oscillator can be an electro-optic (EO) comb generator including a seed laser and an EO modulator, where the first analog phase control loop controls a frequency of the seed laser, and the second analog phase control loop controls a frequency provided to the EO modulator.

The local oscillator can be a mode-locked laser, where the first analog phase control loop controls an optical frequency of the mode-locked laser, and the second analog phase control loop controls a repetition rate of the mode-locked laser. Mode locking of the mode-locked laser is preferably active mode locking or hybrid mode locking.

The mode-locked laser can be a semiconductor mode-locked laser including a gain section, a phase tuning section and a saturable absorber section (3-section laser). Here the first analog phase control loop controls the optical frequency of the mode-locked laser by providing a control input to the phase tuning section, and the second analog phase control loop controls a frequency provided to the saturable absorber section.

Alternatively, the mode-locked laser can be a semiconductor mode-locked laser including a gain section and a saturable absorber section (2-section laser), where the gain section or the saturable absorber section can also provide phase tuning. Here the first analog phase control loop controls the optical frequency of the mode-locked laser by providing a control input to the section that provides phase tuning, and the second analog phase control loop controls a frequency provided to the saturable absorber section.

The coherent optical receiver as a whole can be hybridly integrated. For example, the electronic and optical chips of the receiver can be co-designed so that electrical interconnects are side-by-side and the resulting bond wire lengths are sub-mm. In such cases, it is typically important to consider interconnect parasitics in the detailed design. Alternatively, the coherent optical receiver as a whole could be monolithically integrated.

In monolithic integration, the circuit is a single chip that is fabricated by numerous processing steps that may modify one material (e.g., planar technology) or incorporate multiple materials (e.g., via growth and deposition techniques). In hybrid integration, the circuit comprises multiple monolithic chips, which are fabricated separately and then joined together electrically and/or optically, for example by fiber or waveguide coupling, cementing, bonding, wire bonding or soldering into a single packaged unit.

Significant advantages are provided. Power consumption is reduced by the use of analog components for carrier recovery (i.e., no power-hungry high-speed digital signal processing is employed). The phase coherence of the frequency comb is exploited so that carrier recovery for all the channels is accomplished using two control loops. This is a significant improvement relative to systems that recover the carrier for each WDM channel independently.

BRIEF DESCRIPTION OF THE DRAWINGS

FIG. 11 is Table I, a table of loss, gain and power for an exemplary MLL comb-based system.

FIG. 12 is Table II, a comparison of MLL and RE-EO combs for WDM analog coherent links.

FIG. 13 is Table III, a power consumption summary.

FIG. 14 is Table IV, Tx optics power tracking.

FIG. 15 is Table V, Rx optics power tracking.

FIG. 16 is Table VI, Tx electronics power tracking.

FIG. 17 is Table VII, Rx electronics power tracking.

DETAILED DESCRIPTION

Figure 1:
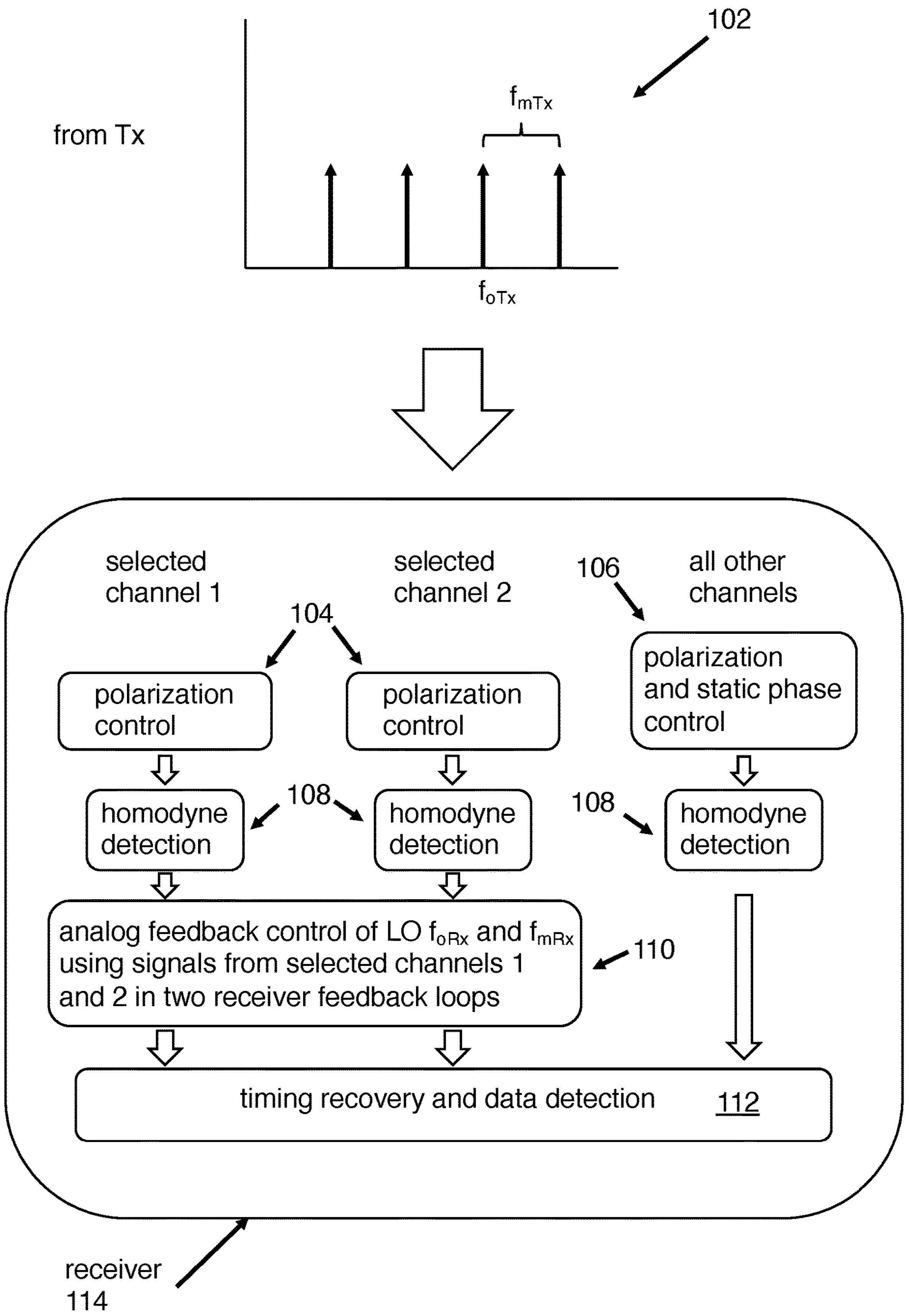
FIG. 1 is a simplified architecture diagram relating to embodiments of the invention.

This description provides detailed examples of coherent frequency comb receivers as described above for two exemplary optical frequency comb sources: mode-locked lasers and electro-optic comb generators.

I. INTRODUCTION

As data center links scale to higher bit rates, novel architectures that may improve density, spectral efficiency, receiver sensitivity and energy efficiency become important to study. In coherent optical links, a received signal is mixed with a strong local oscillator (LO), improving receiver sensitivity and increasing link budget. A coherent receiver can detect information encoded in all degrees of freedom of the signal field, enabling use of spectrally efficient modulation formats, such as dual-polarization (DP) phase-shift keying (PSK) or quadrature amplitude modulation.

Optical frequency combs obviate the need for multiple discrete lasers in wavelength-division-multiplexed (WDM) links. In addition, combs may simplify carrier recovery (CR) in coherent receivers. Electro-optic (EO) transmitter and LO combs can be synchronized by transmitting a pilot tone to injection lock the LO seed laser, which is then used to generate an LO comb. Using a pilot tone, however, leaves parts of the signal spectrum unmodulated, reducing overall spectral efficiency. Joint CR schemes using digital signal processing (DSP) exploiting phase coherence between comb lines have also been considered for comb-based links. Employing high-speed DSP may, however, increase power consumption, which is not ideal for power-constrained data center systems.

Resonator-enhanced (RE) EO combs are promising candidates for coherent data center links with simplified carrier recovery. RE-EO combs fabricated on thin-film lithium niobate (TFLN) offer wide, flat spectra that support numerous wavelength channels. The phase noise of the EO comb lines is completely determined by two random variables. The seed laser phase noise is common to all comb lines, while the microwave oscillator phase noise varies linearly with the comb line index. An RE-EO comb-based analog WDM coherent receiver exploits these phase noise characteristics to perform CR using only two phase-locked loops (PLLs), which control the seed laser phase noise and the microwave oscillator phase noise, respectively.

Semiconductor mode-locked lasers (MLLs) provide another option for comb-based links. They can be realized using III-V materials, which can be heterogeneously integrated onto silicon photonics platforms. Previous work has demonstrated phase synchronization of a passively MLL to a stable reference laser on an integrated platform. Two independent MLLs have been synchronized by injection locking an LO MLL to two adjacent modes of a signal MLL. Coherent WDM data transmission using MLLs as both transmitter and LO has been demonstrated, using offline DSP to perform CR through a blind phase search algorithm.

Actively and hybridly MLLs are more stable sources than passively MLLs, owing to the forcing effect of microwave modulation. The modulation also provides a means for synchronizing two MLLs, similar to the synchronization of two EO combs. This work studies phase synchronization between two optical sources generating the transmitter and LO combs in a WDM link to enable coherent detection of all the channels. All the comb lines are synchronized using just two optical PLLs, while polarization recovery is performed using cascaded phase shifters driven by marker tone detection. This scheme can be implemented using analog circuitry, which may be preferable to high-speed DSP in power-constrained links.

In this work, we consider both EO and MLL comb based architectures. Further aspects of this work include: (1) a hybridly MLL design based on a three-section Fabry-Perot structure appropriate for control by two PLLs in a shared CR scheme; (2) a symmetric CR configuration that achieves lower phase error between signal and LO than an asymmetric CR configuration also considered; and (3) detailed comparisons between MLL and RE-EO comb generators as sources in WDM analog coherent links, and a comparison of these comb-based designs to those using arrays of single-wavelength lasers.

The remainder of this description is organized as follows. Section II presents two semiconductor MLL comb-based analog coherent link designs using different CR schemes and analyzes their phase-error performance. It also presents a semiconductor MLL structure compatible with the proposed comb-based CR schemes, and an exemplary EO comb based architecture. Section III studies an exemplary system, quantifying key performance metrics, including phase error, link SNR budget and the effect of chromatic dispersion. Section IV addresses third-order nonlinear effects on phase noise, compares MLL and RE-EO combs as sources for WDM analog coherent links, and studies the power consumption of such links using comb or single-wavelength laser sources. Section V presents conclusions.

II. TRANSCEIVER DESIGN

In this section, we provide an overview of the frequency comb-based analog coherent transceiver and provide a framework for analyzing the system phase-noise performance.

A. Overview

Figure 2A:
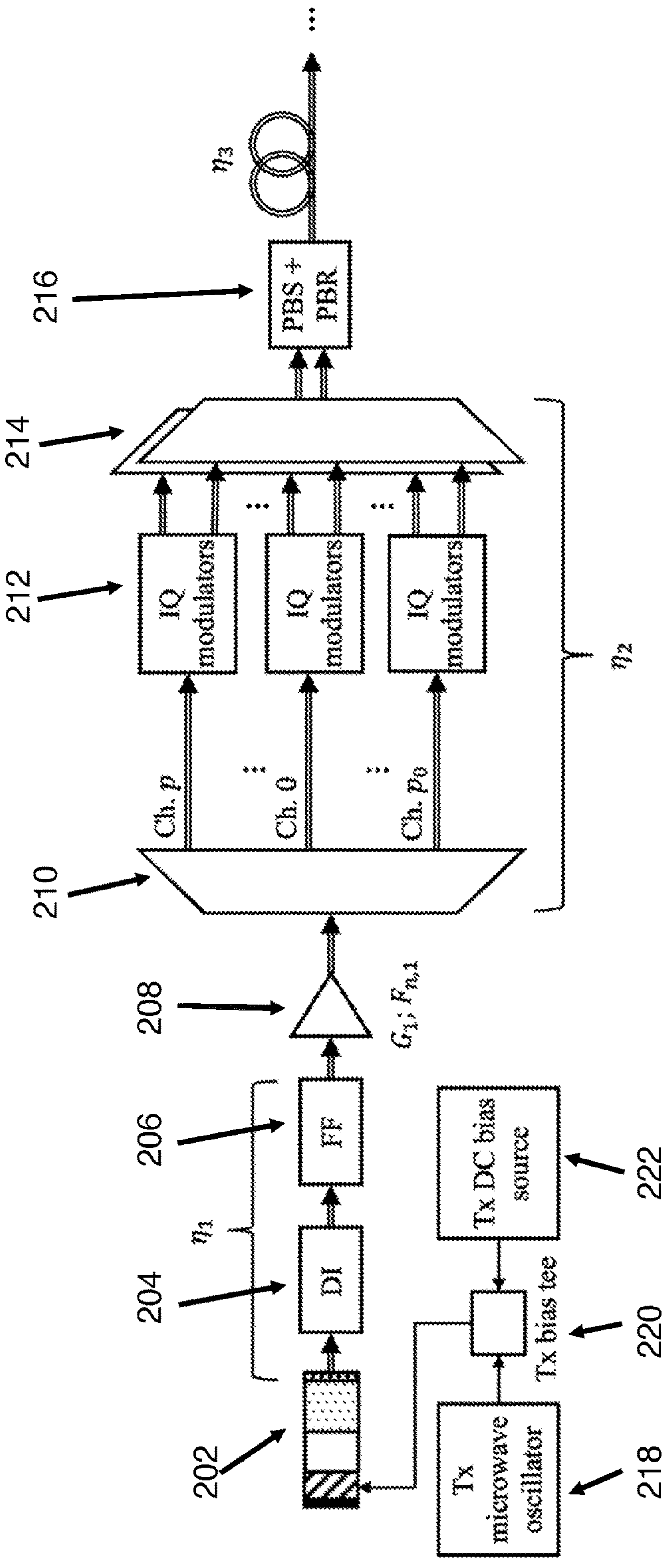
FIGS. 2A-B show two exemplary frequency-comb transmitters.

FIG. 2A shows an exemplary MLL-based comb transmitter. A semiconductor MLL 202 acting as a multi-wavelength source has a gain section (dotted fill), a phase-tuning section (no fill), and a saturable absorber section (striped fill). The saturable absorber section is reverse biased and modulated by a microwave source 218 to enact hybrid mode locking. DC (direct current) biases to the gain and phase-tuning sections of MLL 202 are not shown. Additional components shown on this figure are de-interleaver (DI) 204, flattening filter (FF) 206, transmitter optical amplifier 208, transmitter wavelength demultiplexer 210, IQ (in-phase and quadrature) modulators 212, transmitter wavelength multiplexer 214, and transmitter polarization combiner 216. In this example, transmitter polarization combiner 216 includes a polarization beam splitter (PBS) and polarization beam rotator (PBR). Further components shown are DC bias source 222 and Tx (transmitter) bias tee 220.

Figure 2B:
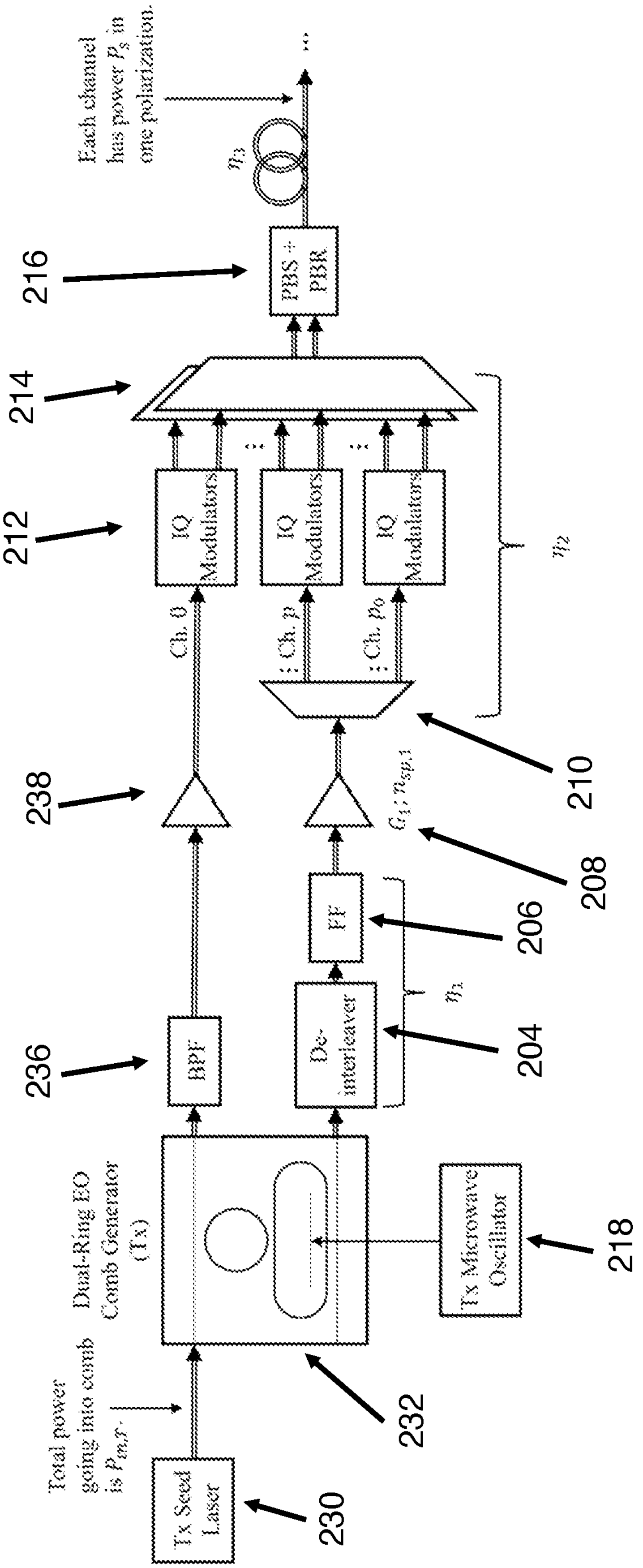

FIG. 2B shows a comb transmitter based on an EO comb generator. Here 230 is the Tx seed laser that provides an optical input to EO comb generator 232, while microwave source 218 provides the electrical input to comb generator 232. Comb generator 232 has two optical outputs. One output is at the original wavelength of the Tx seed laser, and is filtered in bandpass filter 236, amplified by optical amplifier 238 and is modulated by one of the IQ modulators 212. The other optical output of comb generator 232 includes the rest of the frequency comb, and is passed through de-interleaver 204, flattening filter 206, optical amplifier 208 and Tx demultiplexer 210 to be modulated by IQ modulators 212. The rest of this transmitter is as described in connection with FIG. 2A.

Throughout this description, comb lines are indexed by an integer p, where $-p_0 \le p \le p_0$. The index p=0 corresponds to the central channel, while the indices $p=\pm p_0$ correspond to the outermost channels.

FIGS. 2A-B show the transmitter, which uses either an MLL comb (FIG. 2A) or a RE-EO comb generator with a seed laser (FIG. 2B) as the multi-wavelength optical source. The comb may pass through a de-interleaver (DI), a flattening filter (FF), and a semiconductor optical amplifier (SOA) before data modulation. The DI ensures a sufficiently large channel spacing when the comb spacing is too small to accommodate the symbol rate.

Figure 3A:
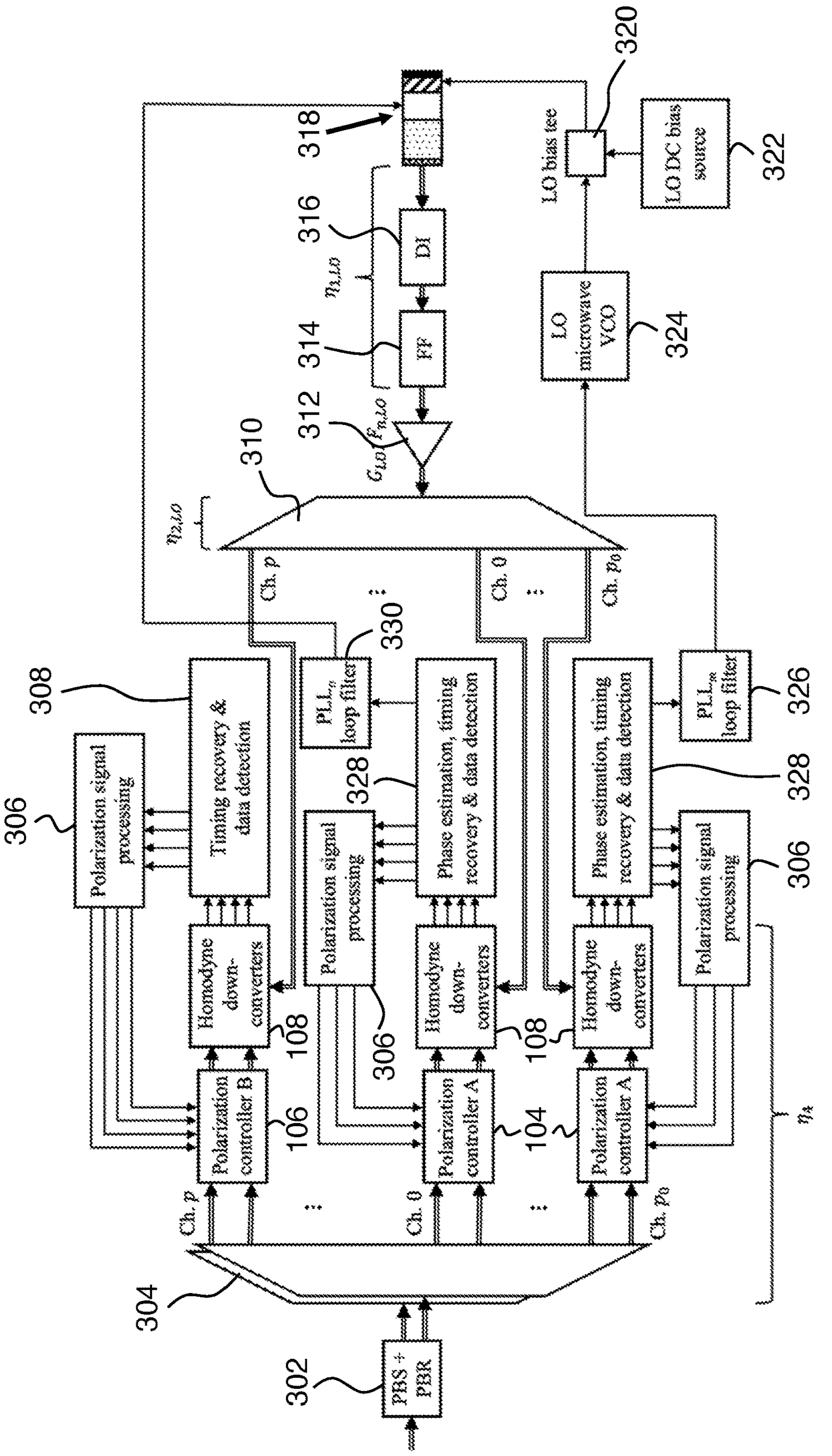
FIGS. 3A-C shows three exemplary frequency comb receivers according to embodiments of the invention.
Figure 3B:
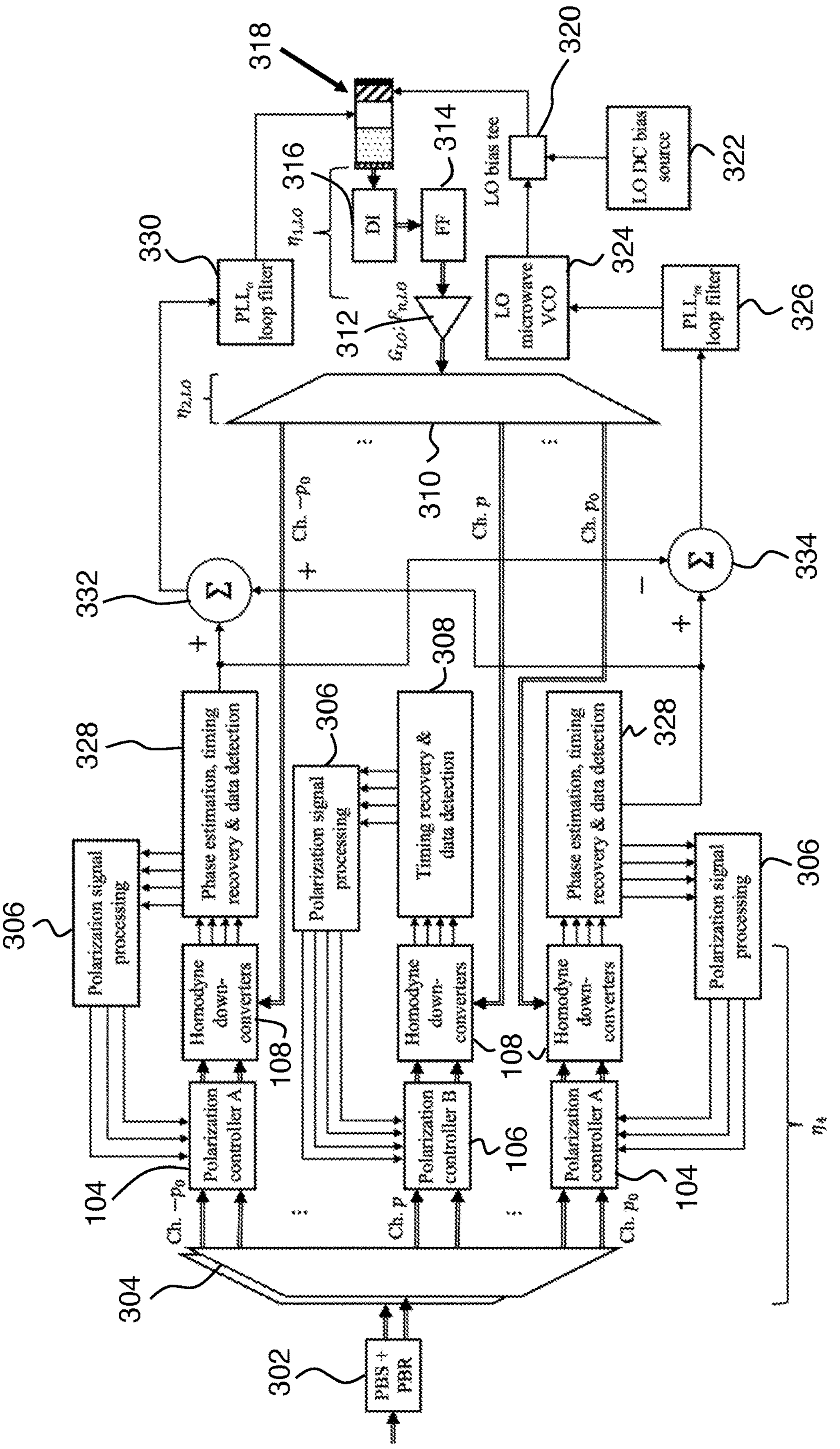

FIGS. 3A-B show two configurations for the MLL comb-based analog coherent receiver. Each uses two PLLs to perform CR and uses polarization controllers of type A (104) or B (106) to perform polarization recovery and remove static phase offsets. The MLL 318 has a gain section (dotted fill), a phase-tuning section (no fill) that determines the comb center frequency, and a microwave-modulated saturable absorber section (striped fill) that determines the comb spacing. A DC bias to the gain section is not shown. Further components on these figures include: receiver polarization splitter 302, receiver wavelength demultiplexer 304, polarization signal processing 306, timing recovery and data detection 308, LO wavelength demultiplexer 310, LO optical amplifier 312, LO flattening filter 314, LO de-interleaver 316, LO bias tee 320, LO DC bias source 322, LO microwave VCO (voltage-controlled oscillator) 324, $PLL_m$ loop filter 326, phase estimation timing recovery and data detection 328, and $PLL_o$ loop filter 330.

In the asymmetric CR configuration of FIG. 3A, phase estimation is performed on channels 0 and $p_0$, and the comb line index p corresponds to any of the other channels. In the symmetric CR configuration of FIG. 3B, phase estimation is performed on channels $-p_0$ and $p_0$, and the comb line index p corresponds to any of the other channels. The configuration of FIG. 3B also shows a sum 332 of phase error signals used as the input to $PLL_o$ loop filter 330 and a difference 334 of these two phase error signals used as the input to $PLL_m$ loop filter 326.

FIGS. 3A-B show two exemplary MLL comb-based analog coherent receiver designs. Each design uses an MLL comb, nominally identical to the transmitter comb, as a multi-wavelength LO source, and uses two PLLs to perform CR for all the data-bearing channels. The two designs differ in the channels on which phase estimation is performed. The asymmetric CR design in FIG. 3A makes phase estimates on channels 0 and $+p_0$, while the symmetric CR design in FIG. 3B makes phase estimates on channels $-p_0$ and $+p_0$. In each design, the index p corresponds to any of the channels not used for phase estimation.

Figure 3C:
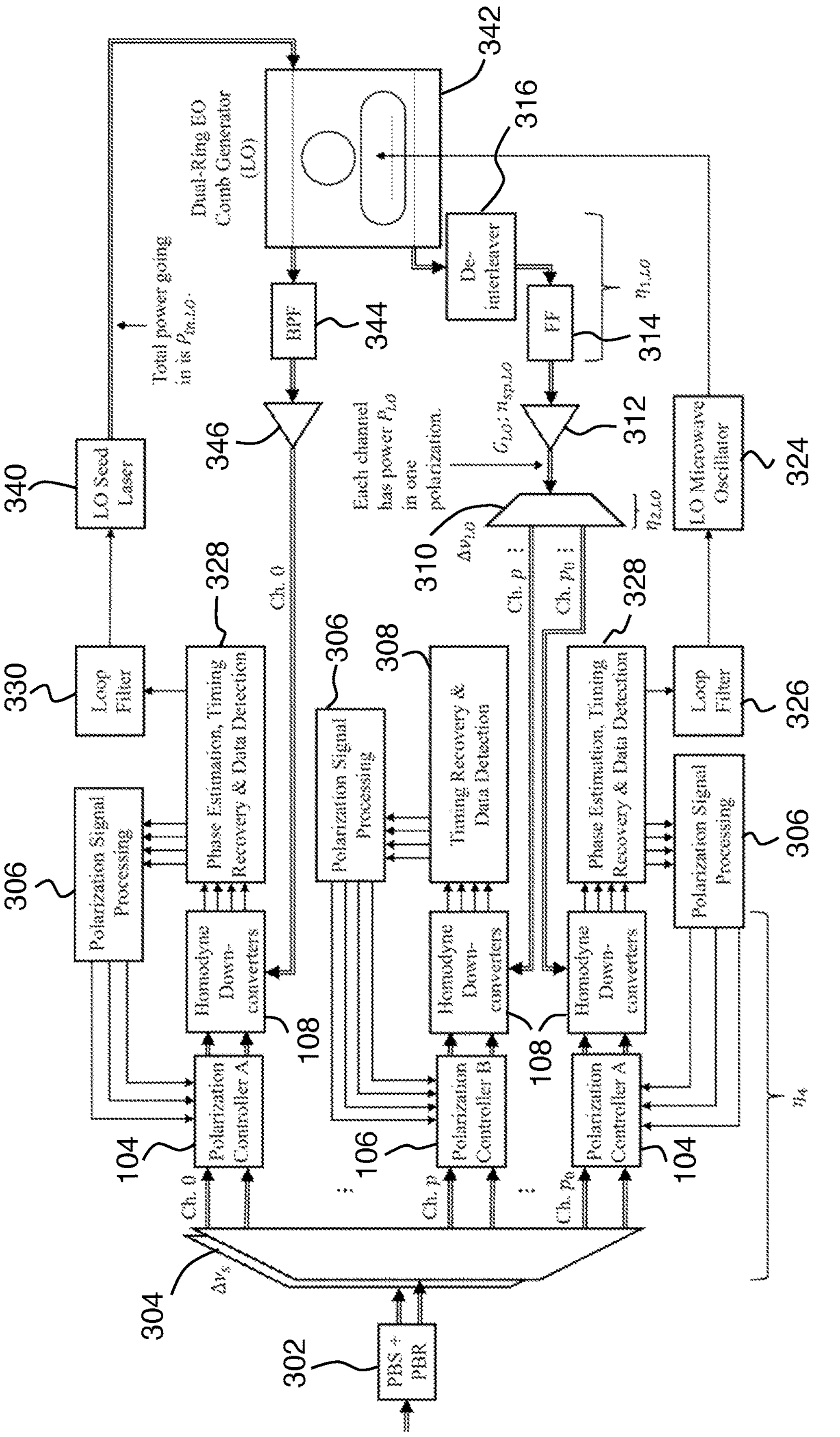

FIG. 3C shows an exemplary RE-EO comb-based analog coherent receiver design employing the asymmetric CR scheme. The differences between FIG. 3C and FIG. 3A result from replacing the MLL local oscillator of FIG. 3A with the EO comb generator local oscillator of FIG. 3C. More specifically, the new components on FIG. 3C are: LO seed laser 340, EO comb generator 342, bandpass filter 344 and optical amplifier 346.

Figure 4:
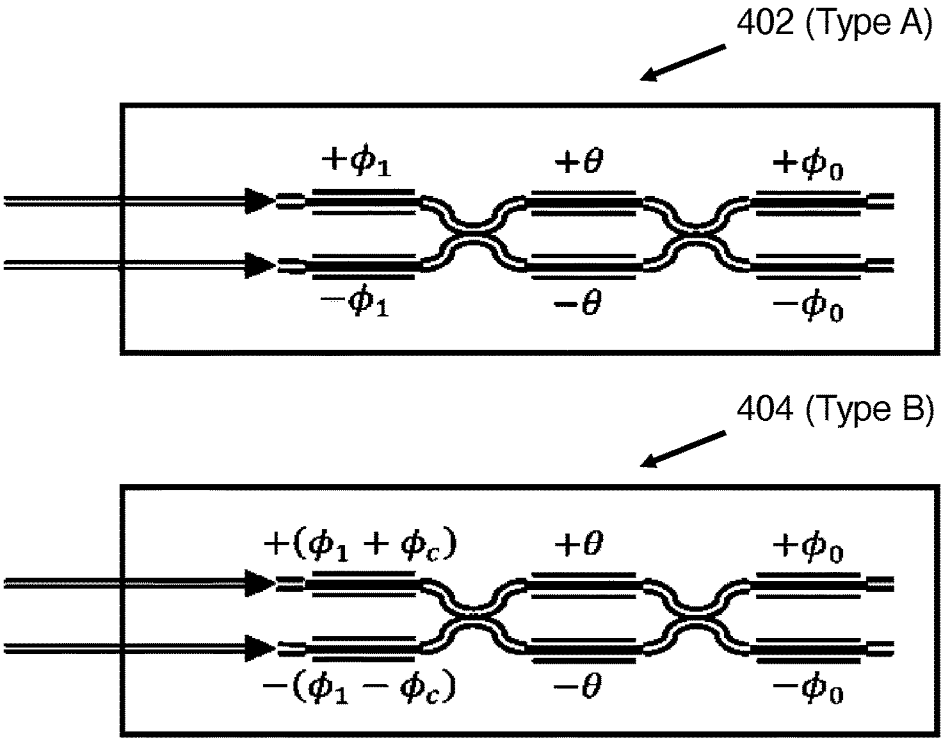
FIG. 4 shows two polarization controllers suitable for use in embodiments of the invention.

FIG. 4 shows type A and type B polarization controllers (402 and 404, respectively). Controller type A compensates for polarization rotation using three phase shifters driven by three low-speed control signals. Controller type B compensates for polarization rotation and an additional constant phase offset using three phase shifters driven by four low-speed control signals.

Polarization rotation typically varies on a timescale of several milliseconds in short-reach links. In these designs, this can be compensated using optical polarization controllers driven by low-speed circuitry. Polarization controller type A (104 on FIGS. 3A-C) performs polarization de-rotation and is shown as 402 on FIG. 4.

In order to recover polarization, the transmitter sends a low-frequency marker tone on the X-polarization of the in-phase (I) component (the XI tributary). After reaching the receiver, the marker tones detected on the XQ, YI and YQ tributaries are extracted using low-pass filters (LPFs) and passed to a microcontroller, which adjusts the three phase shifters of polarization controller type A to minimize the marker tones detected in the latter three tributaries. This polarization recovery scheme is known in the art.

Channels that do not employ PLLs for carrier synchronization have a constant phase offset between the signal and LO that needs to be removed. Both polarization de-rotation and removal of the constant phase offset can be accomplished using polarization controller type B shown as 404 on FIG. 4. Polarization controller B is driven by low-speed marker tone detection circuitry. Controller type B has four controlled phases ($\phi_1\phi_c$,$\theta$,$\phi_0$). We describe the polarization and phase offset recovery scheme in the following paragraphs.

In order to compensate for the polarization rotation and constant phase offset, marker tones at two different low frequencies are added to the drive signals of two different tributaries at the transmitter, modulating their amplitudes. Tone A is added to the XI tributary and tone B is added to the YI tributary. The phase shifters are adjusted by a microcontroller to minimize tone A's presence in the XQ, YI, and YQ tributaries and tone B's presence in the XI, XQ, and YQ tributaries. In this scheme, larger marker tone amplitudes and phase adjustment step sizes are used initially to facilitate faster convergence. The stronger marker tones cause a horizontal spread in the signal constellations. The marker tone amplitudes and phase adjustment step sizes are then reduced to yield a cleaner constellation. This method results in a 180° phase ambiguity in both polarizations, which can be resolved by including known training sequences in transmitted data or by using information obtained in error-correction decoding. At a target BER of $2.4\lambda10^{-4}$ for a signal using 16-ary quadrature amplitude modulation (16-QAM), marker tone detection results in an SNR penalty of about 0.5 dB.

Common polarization de-rotation for all channels is also possible. In this case, two cascaded phase shifters will be placed in front of the de-multiplexer 304 in FIGS. 3A-C for polarization de-rotation and an additional phase shifter for each channel will be placed after the de-multiplexer for phase offset cancellation. Common polarization control will, however, place restrictions on link distance and total system bandwidth.

These polarization controllers can be implemented using thermo-optic phase shifters, which have low losses and response times on the order of several microseconds to several tens of microseconds, potentially enabling a low-cost and low-power solution. Endless polarization control can be accomplished by resetting the phase shifters when they are close to their excursion limits, using interleaving and error-correction decoding to compensate for the associated burst errors.

Figure 5A:
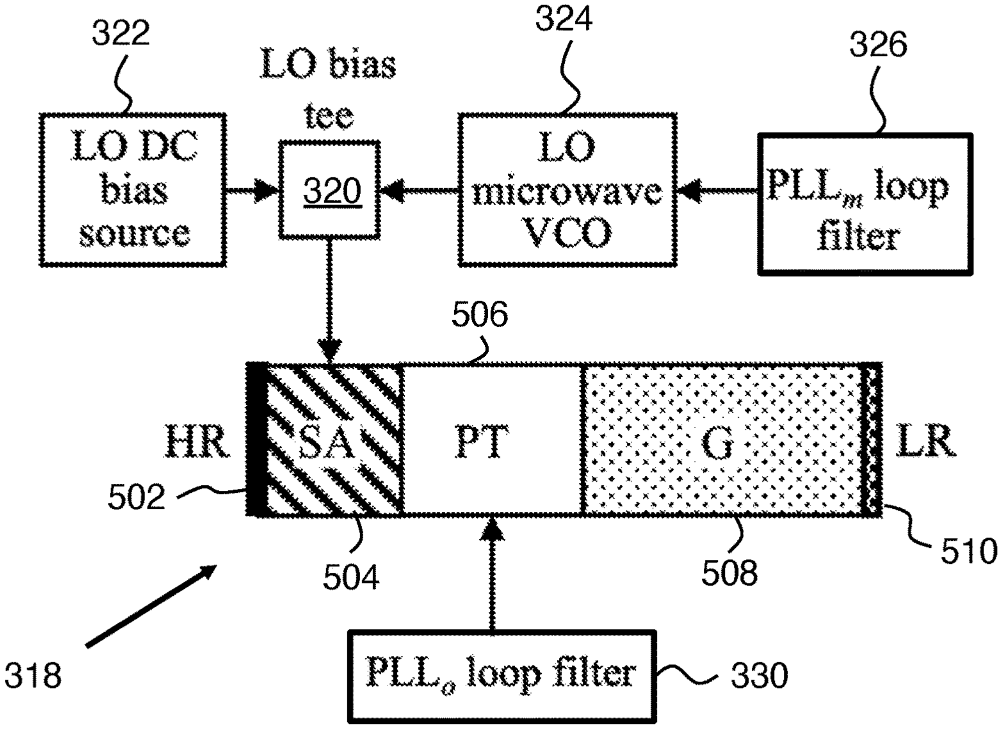
FIG. 5A-B show two exemplary mode locked laser configurations for generating a frequency comb.

FIG. 5A shows an exemplary MLL design (shown as used in generating the receiver LO comb). The MLL employs a three-section Fabry-Perot cavity with a high-reflectance (HR) coating 502 and a low-reflectance (LR) etched facet (R≈32%) 510 on its ends. A gain (G) section 508 comprises active gain material. A phase-tuning (PT) section 506 comprises passive material, and receives a control current from $PLL_o$ 330 to lock the comb center frequency $f_o$. A saturable absorber (SA) section 504 comprises active gain material. It is reverse biased and modulated by a microwave voltage-controlled oscillator (VCO) 324 to enact hybrid mode locking. The microwave VCO 324 receives feedback from $PLL_m$ loop filter 326 to lock the comb spacing $f_m$. A DC bias to the gain section is not shown.

Figure 5B:
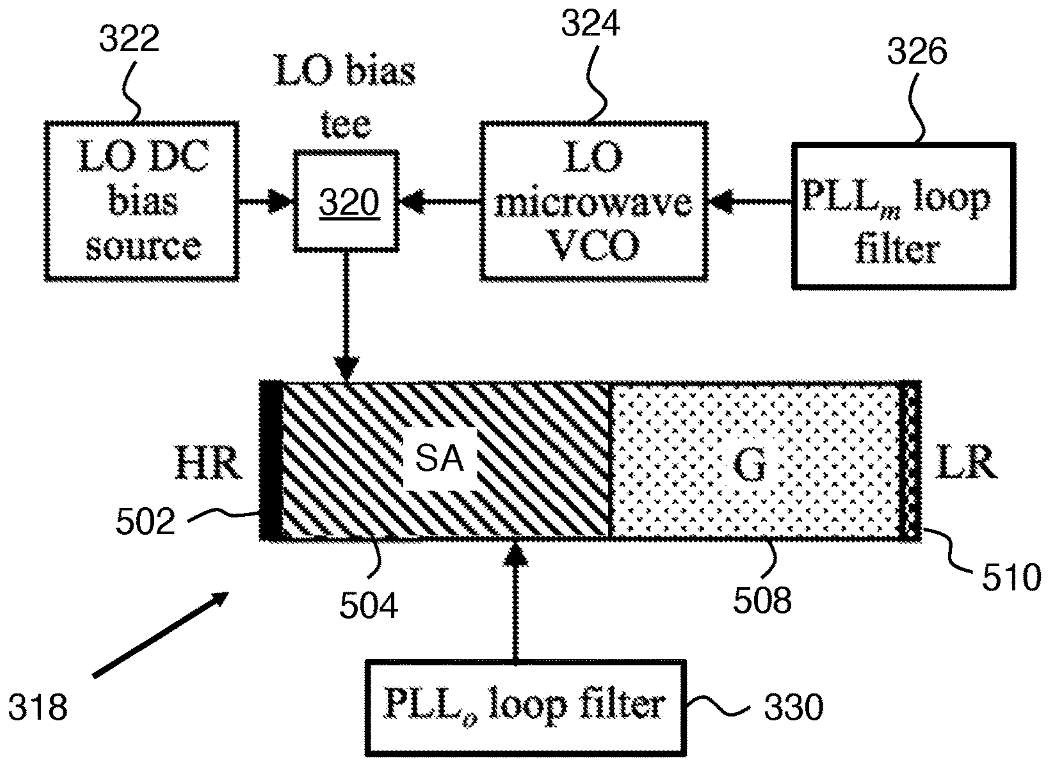

FIG. 5B shows an alternative where the MLL 318 is a 2-section laser with the SA section 504 also capable of providing phase tuning.

Figure 6:
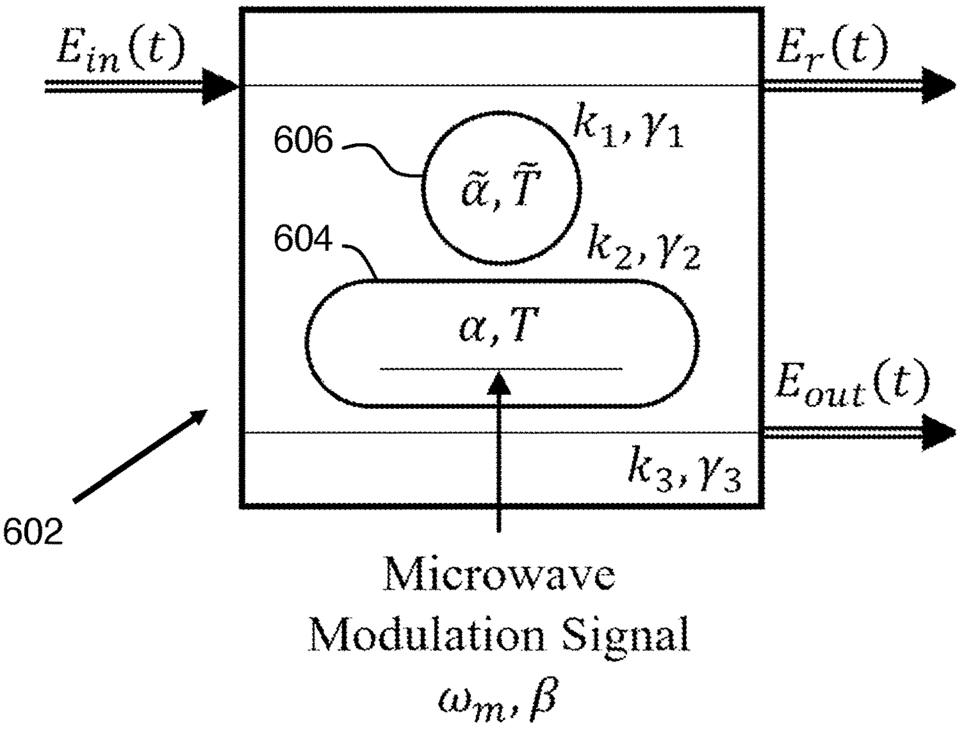
FIG. 6 shows an exemplary electro-optic frequency comb generator.

A dual-ring RE-EO frequency comb generator (e.g., 602 on FIG. 6) along with an appropriate seed laser can also act as the transmitter and receiver comb sources. The RE-EO comb generator in FIG. 6 has a small ring 606 with a round-trip time of $\tilde{T}$ and a round-trip loss of $(1-\tilde{\alpha})$ as well as a phase-modulated large ring 604 with a round-trip time of T and a round-trip loss of $(1-\alpha)$. The large ring is modulated at the frequency $\omega_m$. The coupler power transfer coefficients are $k_1$, $k_2$, and $k_3$ and the coupler insertion losses are $\gamma_1$, $\gamma_2$, and $\gamma_3$. The dual-ring RE-EO comb generator offers more efficient conversion of input power to comb line power than a single-ring device, as the small ring facilitates greater power build-up before coupling and comb-generating modulation in the larger ring. We note that in the multi-wavelength analog coherent architecture shown in FIG. 3C, the central channel (p=0) uses the field $E_r(t)$ reflected from the RE-EO comb generator input instead of the central line of the output field $E_{out}(t)$, as the former typically has higher power. The round-trip time $\tilde{T}$ of the small ring can be designed to concentrate power onto relevant channels of the system. For instance, in a 17-channel system, we may choose $\tilde{T}=T/16.7$ to concentrate power into the 32 lines nearest to the central line and then perform de-interleaving to obtain 17 required channels.

The MLL and RE-EO comb output spectrum contains lines at frequencies $f_o+pf_m$ for integer values of the comb line index p. The optical frequency $f_o$ is the frequency of the 0-th comb line, and coincides with the nominal comb center frequency. The microwave modulation frequency $f_m$ (or $\omega_m$) determines the comb spacing and should coincide approximately with the cavity free spectral range (FSR) of either the laser cavity in the MLL or the ring structures in the RE-EO comb.

The MLL design in FIG. 5A is designed specifically to be driven by two optical PLLs in the receiver. A first PLL, $PLL_o$, drives the PT section 506 to control $f_o$, locking the common optical frequency and phase of the LO comb to those of the transmitter comb. The microwave modulation to the SA section is provided by a voltage controlled oscillator (VCO). A second PLL, $PLL_m$, drives the VCO to control $f_m$, locking the frequency spacings and relative phases in the LO comb lines to those in the transmitter comb. When DR-EO combs are used as transmitter and LO sources, $PLL_o$ controls the LO comb seed laser, while $PLL_m$ controls the LO comb microwave oscillator.

In the following subsection, we study the phase noise of the MLL and EO combs.

B. Phase Noise Analysis

The MLL in FIG. 5A has a modulated SA at one end of the cavity, similar to a device studied in the literature. Under hybrid mode locking, it is known that the phase noise on the p-th comb line is given by $$\varphi_p(t) = \sum_{n=0}^{\infty} A_n(t) H_n\left(\frac{\sqrt{2}p}{P}\right), \tag{1}$$

where P is the number of locked modes (or comb lines), and $H_n(x)$ is the n-th order Hermite polynomial. The $A_n(t)$ are expansion coefficients, which are computed by solving mode-locking equations under noise perturbations. The phase noise $\varphi_p(t)$ can be well-approximated by the first two terms of (1):

$$\begin{aligned}\varphi_p(t) &\approx A_0(t) + A_1(t)\cdot\frac{2\sqrt{2}p}{P} \\ &= \varphi_o(t) + p\varphi_m(t).\end{aligned} \tag{2}$$

In the second line of (2), we have defined an optical phase noise $\varphi_o(t)=A_0(t)$, which is common to all the comb lines, and a microwave phase noise $$\varphi_m(t) = \frac{2\sqrt{2}}{P}A_1(t),$$

whose contribution to the total phase noise (2) varies linearly with comb line index p. The phase noise of the p-th RE-EO comb line also follows the form shown in (2).

The optical phase noise $\varphi_o(t)$ is a Wiener process, which we characterize by an optical linewidth $\Delta v_o$. In hybridly and passively MLLs, the microwave phase noise $\varphi_m(t)$ is also a Wiener process, which we characterize by a microwave linewidth $\Delta v_m$. The p-th comb line has a linewidth $\Delta v_p=\Delta v_o+p^2\Delta v_m$, which varies quadratically with comb line index p. The phase noise model (2), containing a common term and a term varying linearly with comb line index, giving rise to a linewidth varying quadratically with comb line index, is consistent with other work.

The two phase noise processes, $\varphi_o(t)$ and $\varphi_m(t)$, motivate the use of two PLLs, $PLL_o$ and $PLL_m$, in the comb-based analog coherent receiver. The PLLs of the earlier examples can be studied using the linear models of FIGS. 7A-B and 8. Here FIGS. 7A-B relate to asymmetric carrier recovery where $PLL_o$ (FIG. 7A) and $PLL_m$ (FIG. 7B) have independent inputs, and FIG. 8 relates to symmetric carrier recovery where the two loops are coupled.

These mathematical models employ the following notation:

1. $\varphi_o(t)$ and $\varphi_m(t)$ now denote the combined optical and microwave phases noises of the transmitter and LO combs, which are Wiener processes. $\Delta v_o$ and $\Delta v_m$ now denote the beat linewidths of these combined phase noises.
2. $\psi_o(t)$ is the optical control phase of the LO MLL (or DR-EO comb), induced by the $PLL_o$ loop filter driving its PT section (or seed laser). $\psi_m(t)$ is the microwave control phase of the LO MLL (or DR-EO comb), induced by the $PLL_m$ loop filter driving the microwave VCO. The total control phase on the p-th LO comb line is $\psi_p(t)=\psi_o(t)+p\psi_m(t)$.
3. $w_i(t)$ are the additive white Gaussian noise (AWGN) components on the channels from which the PLLs derive their phase estimates. For QPSK, they have two-sided power spectral densities $$S_{w_i w_i}(\omega) = \frac{T_s}{2\gamma_i} \text{ for } i \in \{0, \pm p_0\} \tag{3}$$

where $\gamma_i$ is the symbol signal-to-noise ratio (SNR) on the i-th channel and $T_s$ is the symbol interval.

4. $\tau_o$ and $\tau_m$ are the path delays of $PLL_o$ and $PLL_m$, respectively.

5. $F_o(s)$ and $F_m(s)$ are the second-order loop filter transfer functions for $PLL_0$ and $PLL_m$, respectively. They are defined as $$F_i(s) = 2\zeta\omega_{n,i} + \frac{\omega_{n,i}^2}{s} \text{ for } i \in \{o, m\} \tag{4}$$

where $\omega_{n,o}$ and $\omega_{n,m}$ are the natural frequencies of their associated PLLs, and $\zeta=1\sqrt{2}$.

6. $\varepsilon_o(t)=\varphi_o(t)-\psi_o(t)$ and $\varepsilon_m(t)=\varphi_m(t)-\psi_m(t)$ are respectively, the optical and microwave phase errors between the transmitter and LO combs. The total phase error on the p-th channel is $\varepsilon_o(t)+p\varepsilon_m(t)$.

The phase-error standard deviation on the p-th channel can be written as $$\sqrt{\sigma_{\varepsilon_o}^2 + p^2\sigma_{\varepsilon_m}^2}, \text{ where } \sigma_{\varepsilon_o}^2 \text{ and } \sigma_{\varepsilon_m}^2$$

are the variances of $\in_o(t)$ and $\varepsilon_m(t)$, respectively. Using the linear models in FIGS. 7A-B and 8, we can find expressions for $$\sigma_{\varepsilon_o}^2 \text{ and } \sigma_{\varepsilon_m}^2$$

for the asymmetric and symmetric CR configurations. Assuming all the channels used for phase estimation have the same SNR (i.e., $\gamma_0=\gamma_{\pm p_0}$), we can express the optical phase-error variance as $$\sigma_{\varepsilon_o}^2 = \frac{\pi\Delta v_o}{2\zeta\omega_{n,o}}\Gamma_o^{PN}(\omega_{n,o}\tau_o) + \frac{(1+4\zeta^2)\,\omega_{n,o}T_s}{4\zeta}\frac{1}{2n_{PE}n_c\gamma_0}\Gamma_o^{AWGN}(\omega_{n,o}\tau_o). \tag{5}$$

In (5), $n_{PE}$ is the number of polarizations used in phase estimation. We assume $n_{PE}=^2$. The variable $n_c$ captures the difference between the two receiver CR configurations. In the asymmetric CR scheme, $n_c=1$, while in the symmetric CR scheme, $n_c$–2.

$$\Gamma_o^{PN}(\omega_n\tau) \text{ and } \Gamma_o^{AWGN}(\omega_n\tau)$$

are given by $$\Gamma_o^{PN}(\omega_n\tau) = \frac{2\zeta\omega_n}{\pi}\int_{-\infty}^{\infty}\left|j\omega + e^{-j\omega\tau}F_o(\omega)\right|^{-2}d\omega \tag{6}$$

$$\Gamma_o^{AWGN}(\omega_n\tau) = \frac{2\zeta}{\pi(1+4\zeta^2)\,\omega_n}\int_{-\infty}^{\infty}\left|\frac{F_o(\omega)}{j\omega + e^{-j\omega\tau}F_o(\omega)}\right|^2 d\omega \tag{7}$$

Figure 7A:
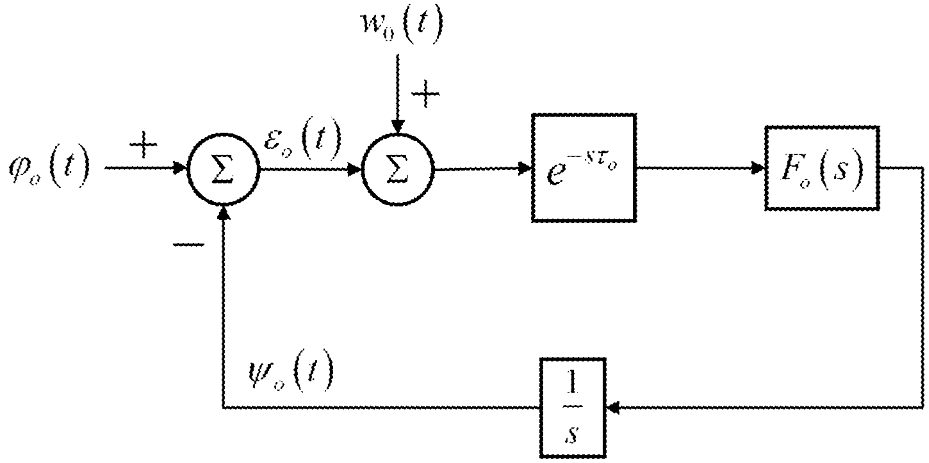
FIGS. 7A-B show loop models for asymmetric carrier recovery.
Figure 7B:
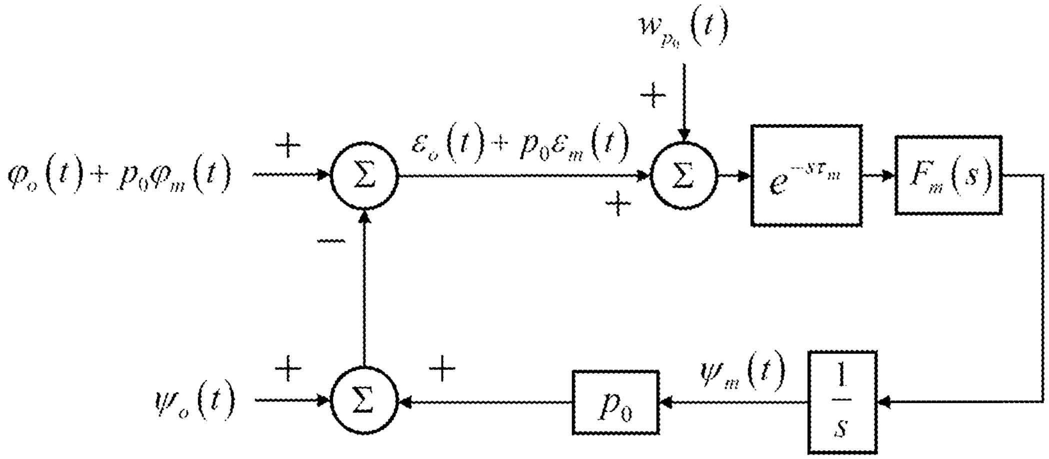
Figure 8:
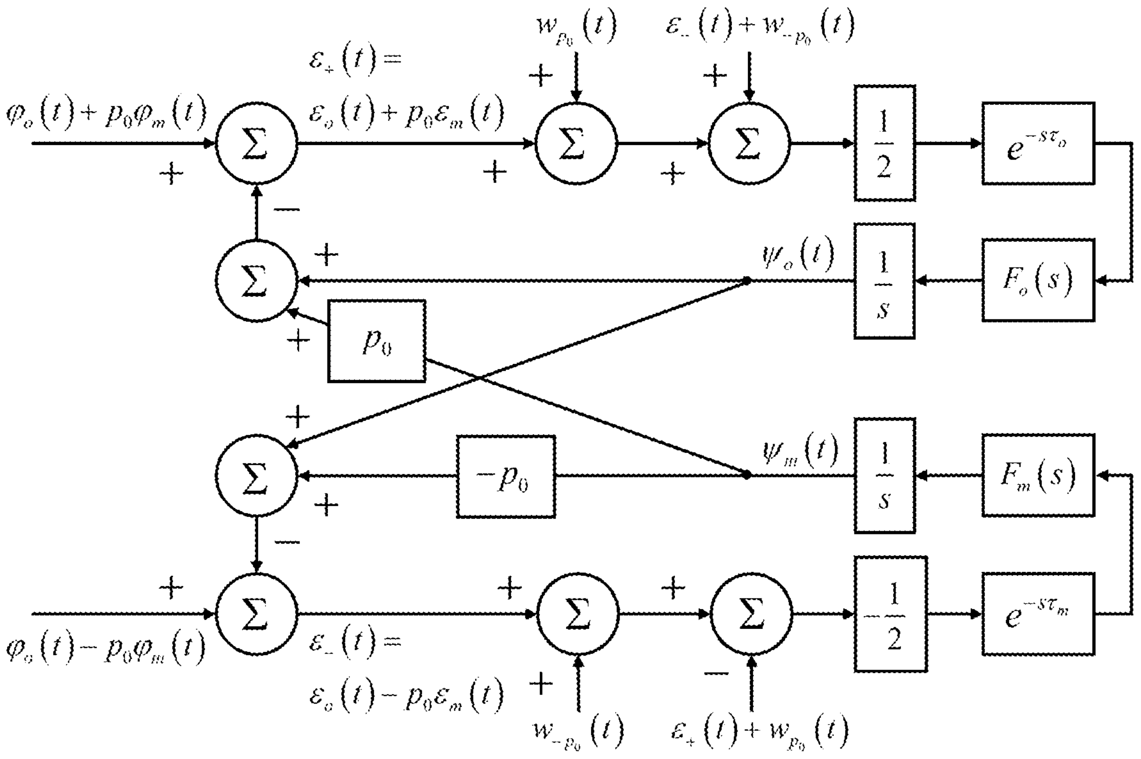
FIG. 8 shows a loop model for symmetric carrier recovery.

The microwave phase-error variance $$\sigma_{\varepsilon_m}^2$$

can likewise be found using the linear models in FIGS. 7A-B and 8:

$$\sigma_{\varepsilon_m}^2 = \frac{\pi\Delta v_m}{2\zeta\omega_{n,m}}\Gamma_m^{PN}(\omega_{n,m}\tau_m) + \frac{(1+4\zeta^2)\,\omega_{n,m}T_s}{4\zeta}\frac{1}{2n_{PE}n_c\gamma_0}\Gamma_m^{AWGN}(\omega_{n,m}\tau_m) \tag{8}$$

where $$\Gamma_m^{PN}(\omega_n\tau) \text{ and } \Gamma_m^{AWGN}(\omega_n\tau)$$

are given by $$\Gamma_m^{PN}(\omega_n\tau) = \frac{2\zeta\omega_n}{\pi}\int_{-\infty}^{\infty}\left|j\omega + p_0e^{-j\omega\tau}F_m(\omega)\right|^{-2}d\omega \tag{9}$$

$$\Gamma_m^{AWGN}(\omega_n\tau) = \frac{2\zeta}{\pi(1+4\zeta^2)\,\omega_n}\cdot\int_{-\infty}^{\infty}\left|\frac{F_m(\omega)}{j\omega + p_0e^{-j\omega\tau}F_m(\omega)}\right|^2 d\omega \tag{10}$$

In the following section, we study the performance of the MLL-based analog coherent receiver with a design example.

III. DESIGN EXAMPLE

In this section, we study a multi-wavelength system operating in the O-band, using dual-polarization quadrature phase-shift keying (DP-QPSK) at 56 GBaud symbol rate. The comb spans of integrated semiconductor MLLs are typically limited to tens of nanometers by gain bandwidth and waveguide dispersion. For instance, a span of roughly 13 nm for an InGaAsP/InP quantum well device has been reported in the literature. We conservatively assume a comb span of 1 THz (about 6 nm) and a comb spacing of 40 GHz for the transmitter and LO MLLs. Using DIs to keep only even-indexed comb lines, the system provides 13 data-modulated channels at a channel spacing of 80 GHz. The outermost channels correspond to comb line indices of $\pm p_0=\pm 12$.

We assume a pre-forward error correction (FEC) bit-error ratio (BER) of $2.4\times10^{-4}$, which applies to FEC codes including RS(544, 514). Achieving the target BER requires an SNR per symbol of 10.6 dB for QPSK on an ideal AWGN channel. Considering overhead, the system provides a net bit rate of 2.6 Tb/s.

A. Phase Error

To keep the SNR penalty due to phase error below 1.5 dB, the phase-error standard deviation on each channel should not exceed 7.4° for QPSK.

Figure 9A:
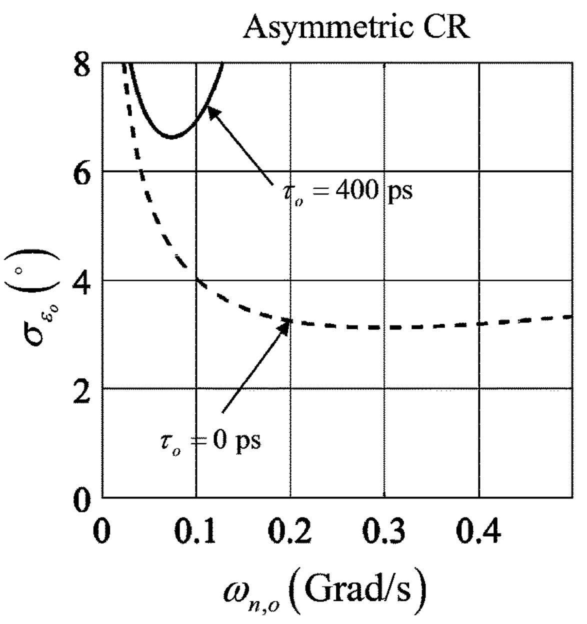
FIGS. 9A-B show optical phase noise results for asymmetric and symmetric carrier recovery.
Figure 9B:
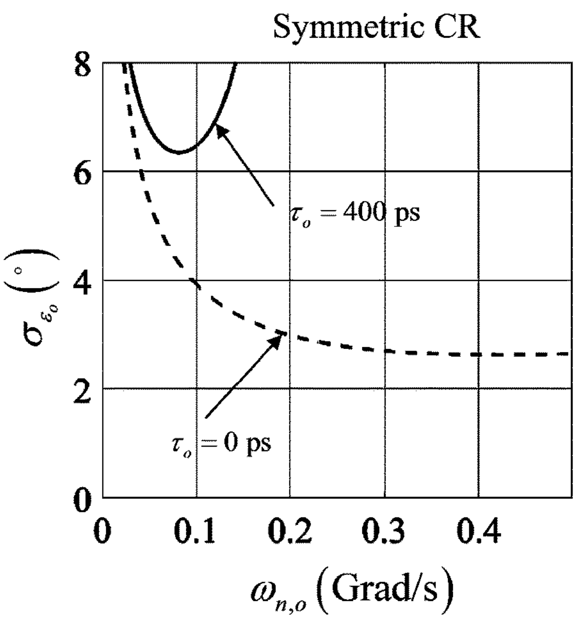

FIGS. 9A-B show the optical phase-error standard deviation $\sigma_{\varepsilon_o}$ against $\omega_{n,o}$, the natural frequency of $PLL_o$, for different values of the loop delay $\tau_o$, for the asymmetric (FIG. 9A) and symmetric (FIG. 9B) CR designs. We assume the beat optical linewidth of the transmitter and LO combs is $\Delta v_o=2$ MHz. This is achievable using the linear cavity design shown in FIG. 5A. Similar linewidths have been reported for InAs/InP Fabry-Perot devices. For $\tau_o=400$ ps, at the respective optimal values of $\omega_{n,o}$, the asymmetric scheme achieves an optical phase-error standard deviation of $\sigma_{\varepsilon_o}=6.62°$, while the symmetric scheme achieves $\sigma_{\varepsilon_o}=6.34°$. The choice of $\tau_o$ is discussed below.

Figure 10A:
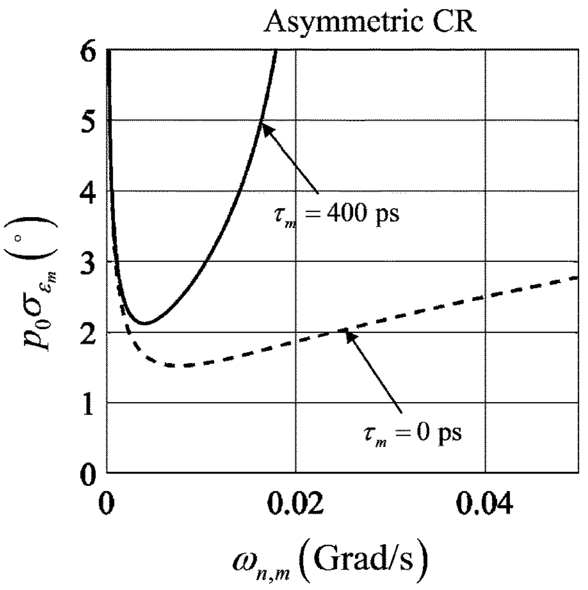
FIGS. 10A-B show microwave phase noise results for asymmetric and symmetric carrier recovery.
Figure 10B:
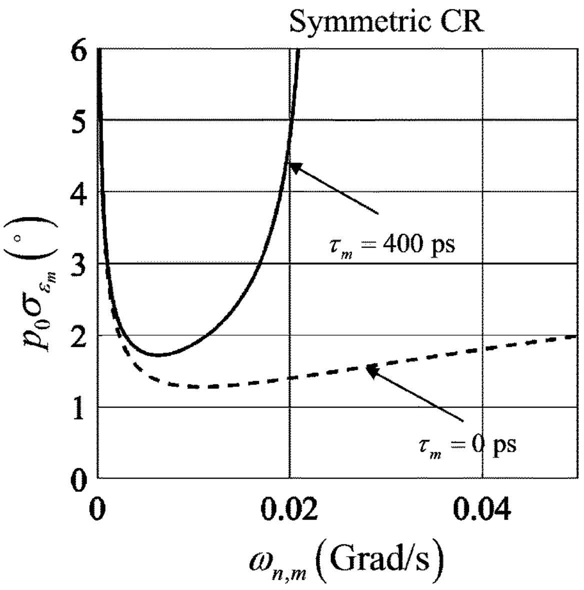

FIGS. 10A-B show the microwave phase-error standard deviation on the $p_0$-th channel, $p_0\sigma_{\varepsilon_m}$, against $\omega_{n,m}$, the natural frequency of $PLL_m$, for different values of the loop delay $\tau_m$, for the asymmetric (FIG. 10A) and symmetric (FIG. 10B) CR designs. The microwave linewidth of actively or hybridly MLLs can be lower than 100 Hz. We assume the beat microwave linewidth of the transmitter and LO combs is $\Delta v_m$=1 kHz. The corresponding microwave phase noise of each comb exceeds that of a low-power monolithic VCO in a similar frequency range. In FIGS. 10A-B, for $\tau_m$=400 ps, at the respective optimal values of $\omega_{n,m}$, the asymmetric scheme achieves $p_0\sigma_{\varepsilon_m}$=2.12°, while the symmetric scheme achieves $p_0\sigma_{\varepsilon_m}$=1.74°. The choice of $\tau_m$ is discussed below.

We will choose $p_0$ to be an outermost channel, i.e., $|p|\le|p_0|$ for all p. In that case, the total phase-error standard deviation on the p-th channel, $$\sqrt{\sigma_{\varepsilon_o}^2 + p^2\sigma_{\varepsilon_m}^2},$$

will not exceed that on the $p_0$-th channel, which is $$\sqrt{\sigma_{\varepsilon_o}^2 + p_0^2\sigma_{\varepsilon_m}^2}.$$

Assuming the loop delays are $\tau_o=\tau_m$=400 ps, the total phase-error standard deviation on any channel will not exceed 7.0° in the asymmetric receiver configuration and 6.6° in the symmetric receiver configuration. Both the asymmetric and symmetric CR schemes yield phase-error SNR penalties below 1.5 dB.

To maintain low phase-error standard deviation, both schemes require the loop delays, $\tau_o$ and $\tau_m$, to not exceed 400 ps. Optical PLLs on photonic integrated circuits (PICs) locking independent lasers have achieved loop delays as low as 120 ps. The PLLs in the MLL comb-based receiver contain similar components, with the addition of an arrayed waveguide grating (AWG) for de-multiplexing the LO comb.

Calculations based on optical path length suggest that compact SiN AWGs can have delays lower than 100 ps.

B. Chromatic Dispersion

Monte Carlo link simulations assuming 5-th order Bessel transmitter and receiver responses with bandwidths equal to 0.7 times the baud rate are performed to determine the tolerable dispersion for QPSK. For a penalty less than 1 dB with a target BER of $2.4\times10^{-4}$, the accumulated dispersion must be limited to $|DL|\le25$ ps/nm. In standard single-mode fiber with 13 channels with 80-GHz spacing centered at 1310 nm, this corresponds to a dispersion-limited transmission distance of about 100 km.

C. Signal-to-Noise Ratio

The target BER of $2.4\times10^{-4}$ requires an SNR per symbol of 10.6 dB on an ideal AWGN channel. Allowing penalties for phase error, chromatic dispersion, polarization recovery and linear crosstalk at 80-GHz channel spacing of 1.5 dB, 1.0 dB, 0.5 dB and 0.5 dB, respectively, we desire to operate at an SNR per symbol of 14.1 dB. Additive noises in the comb-based link include thermal noise, shot noise, noise arising from the LO beating with amplified spontaneous emission (ASE) on the signal, and noise arising from the signal beating with ASE on the LO.

Table I (FIG. 11) lists link parameters used to compute SNR per symbol. Values are taken from the literature. For instance, the first row assumes insertion losses (ILs) or coupling losses of 3 dB, 0.5 dB, and 2 dB for the DI, FF, and MLL-to-PIC coupling. The fourth row assumes a channel loss of 10 dB, corresponding to a fiber length of about 28 km.

The SOA gain values are picked to ensure sufficient SNR to meet the target BER. Both SOAs in the transceiver are operated in saturation. The impact of SOA saturation is discussed in Section IV-A. The values from Table I result in an SNR per symbol of 17.8 dB. The net unallocated link margin is 3.7 dB.

IV. DISCUSSION

In the first subsection below, we discuss the effects of nonlinearities induced by gain saturation in the SOAs. Then, in the next three subsections, we compare MLL and RE-EO comb-based links in terms of comb span, optical linewidth and power consumption. These comparisons refer to Table II (FIG. 12), which summarizes high-level differences between the two comb generators. On Table II, power consumptions are quoted for 13-channel links at 56 GBaud using DP-QPSK modulation. Values in parentheses exclude modulator driver power consumption, which is identical for the two link designs. In the final subsection, we compare asymmetric and symmetric CR schemes.

A. Semiconductor Optical Amplifier Saturation

Saturated operation of an SOA causes nonlinear effects. In particular, four-wave mixing (FWM) generates components at the nominal comb frequencies $\omega_o+p\omega_m$, which may include $|p|>p_0$, corresponding to frequencies not present in the MLL output. The comb spectrum at the SOA output can be computed accurately using known models, informing the design of the flattening filters shown previously.

Under FWM, the model (2) for the phase noise on the p-th comb line remains valid. If comb lines at frequencies $\omega_i=\omega_o+p_i\omega_m$, $\omega_j=\omega_o+p_j\omega_j$), and $\omega_k=\omega_o+p_k\omega_m$ undergo FWM, components are generated at frequencies $\omega_{ijk+}=\omega_i+\omega_j-\omega_k=\omega_o+(p_{ijk+})\omega_m$ and $\omega_{ijk-}=\omega_i-\omega_j+\omega_k=\omega_o+(p_{ijk-})\omega_m$, where $p_{ijk+}=p_i+p_j-p_k$ and $p_{ijk-}=p_i-p_j+p_k$ are the comb line indices of the FWM-generated components. These components will have phase noises $\varphi_o(t)+(p_{ijk+})\varphi_m(t)$ and $\varphi_o(t)+(p_{ijk-})\varphi_m(t)$, respectively, matching the predictions of the phase noise model (2).

B. Comb Span

The comb span of semiconductor MLLs is limited by the active material gain bandwidth and by cavity dispersion effects. The MLL design considered in FIG. 5A has a comb span of approximately 1 THz in the O-band. The comb span could be broadened by inserting a gain-flattening filter and/or dispersion-compensating filter in the cavity.

Inserting these devices, however, would increase the round-trip cavity loss, increasing the phase noise. The gain bandwidth might alternatively be widened by using quantum-dot or quantum-dash active materials.

RE-EO comb generators also have output spectra that roll off away from the central comb line, but can achieve larger comb spans up to several THz. Furthermore, such devices can be designed with the resonator FSR slightly detuned from the modulation frequency defining the comb spacing, such that the output spectrum only spans the desired comb lines. For example, if only 25 comb lines are desired, the resonator FSR can be chosen so the output spectrum is concentrated in lines with indices $-12 \leq p \leq 12$.

While the wider bandwidth of an RE-EO comb may accommodate more data channels than an MLL comb, with either comb type, the number of data channels may be constrained by a limited total comb output power, or by the saturation output power of the SOA amplifying the comb output.

C. Optical Linewidth

The optical linewidth $\Delta v_o$ is a key parameter governing the phase-error performance of analog coherent receivers. Semiconductor MLL combs can achieve optical linewidths in the hundreds of kHz to MHz range, but the optical linewidth depends on the cavity losses and other characteristics of the MLL comb-generating structure. As observed in the previous subsection, intracavity gain flattening or dispersion compensation may widen the comb span, but the consequent increased loss is likely to broaden the optical linewidth.

The optical linewidth of an RE-EO comb is determined by the linewidth of the seed laser, decoupling the optical linewidth from the design of the comb-generating structure. At the transmitter, an RE-EO comb can be seeded by an external cavity laser having a linewidth as narrow as required. At the receiver, the LO comb seed laser should have a sufficiently narrow linewidth, while also having a frequency modulation (FM) bandwidth sufficient to achieve low loop delay in the receiver optical PLL. A two-electrode distributed-feedback laser, with a linewidth of hundreds of kHz and FM bandwidth of hundreds of MHz, is a good candidate to satisfy these requirements. This decoupling of the optical linewidth from the comb-generating structure makes the RE-EO comb a strong candidate for scaling to higher-order modulation formats, such as 16-QAM.

D. Power Consumption

In this subsection, we compare the power consumption of MLL and RE-EO comb-based analog coherent links to their counterparts employing arrays of separate lasers. All three link designs support 13 channels modulated at 56 GBaud by DP-QPSK, as assumed in Section III above. The analysis assumes equal power per channel at the Tx demultiplexer outputs in all three link designs, and at the Rx demultiplexer outputs in all three link designs.

Link power consumption is divided into four categories: (1) transmitter (Tx) optics, (2) Tx electronics, (3) receiver (Rx) optics, and (4) Rx electronics. In the comb-based designs, Tx optics includes the power required for the Tx MLL or seed laser and the Tx booster SOA, Tx electronics includes power required for the comb microwave modulation and data modulator driver circuits, and Rx optics includes power required for the LO MLL or seed laser and the LO booster SOA. In all three designs, Rx electronics includes the power required for the PLLs.

The power consumptions of the three link types are summarized in Table III (FIG. 13). On Table III, values in parentheses exclude modulator driver power consumption, which is identical for the three designs. Details on the power consumption of the various components are provided in Appendix A. In Table III, the columns "Tx Optics Cooling" and "Rx Optics Cooling" assume electrical power not converted to optical power is dissipated locally as heat. Assuming thermoelectric cooling of optical components, the dissipated power $P_d$ is related to the thermoelectric cooler (TEC) power consumption $P_{TEC}$ by the TEC coefficient of performance $\eta_{TEC}=P_d/P_{TEC}$, where a value $\eta_{TEC}=1$ is assumed. Tracking power consumption throughout the link indicates that cooling roughly doubles the overall power consumption of optical components, consistent with thermal management observations in data centers.

As observed in Table III, the power consumed by the Tx and Rx optics and cooling in the MLL comb-based link (0.7 W+0.8 W+0.7 W+0.8 W=3.0 W) is less than in the RE-EO comb-based link (0.8 W+1.4 W+0.8 W+1.4 W=4.4 W), because in the RE-EO comb generator, conversion of seed light to usable comb lines is lossy and requires a high seed laser power. Moreover, the power consumed by the Tx electronics is lower in the MLL comb-based link than in the RE-EO comb-based link, because the SA in the MLL comb requires lower microwave drive power than the phase modulator in the RE-EO comb.

The laser array-based link consumes less power in its Tx and Rx optics and cooling (0.4 W+0.4 W+0.4 W+0.4 W=1.6 W) than the MLL or RE-EO comb-based links, as seen in Table III. Separate lasers can emit at higher power per wavelength than a frequency comb, and power is not lost from comb generation, de-interleaving, and flattening, so the laser array-based link avoids the power consumption associated with booster SOAs. Nevertheless, the MLL comb-based link has lower total power consumption (32.3 W) than the laser array-based link (34.6 W). Excluding modulator driver power, which is identical for the three link designs, the MLL comb-based link power consumption (8.4 W) is substantially lower than that for the laser array-based link (10.7 W). The MLL comb-based link saves power by a reduction in receiver complexity enabled by the phase-coherent combs. The comb-based analog coherent receivers use only two PLLs to achieve CR for 13 channels, while the laser array-based link needs 13 PLLs. This power savings in the MLL-comb-based link more than compensates for the power consumed by comb modulation and booster SOAs. The RE-EO comb-based link consumes more total power than the other two designs, owing especially to the high comb modulation power needed.

The power consumption of the comb-based analog coherent transceiver may be further reduced by decreasing losses associated with de-interleaving and flattening, as well as coupling and insertion losses. These improvements may be enabled by future progress in semiconductor MLL and PIC technologies. Progress in low-drive-power integrated modulators can decrease the power consumption of all three link designs, increasing the fractional power savings for both MLL and RE-EO comb-based links.

E. Carrier Recovery Scheme

In Section III-A, the symmetric CR scheme was shown to achieve a lower phase-error standard deviation than the asymmetric CR scheme considering the optical and microwave phase noises in (2) As explained here, the symmetric CR scheme is also more robust to phase noise contributions that vary with higher powers of p, which are predicted by the infinite summation (1). For example, including terms up to n=2 in (1), the combined phase noise of the transmitter and LO combs on the p-th comb line has the form $$\varphi_p(t)=\varphi_o(t)+p\varphi_m(t)+p^2\varphi_2(t),$$

where $\varphi_2(t)$ is a higher-order phase noise term and the optical phase noise $\varphi_o(t)$ now includes a contribution from the n=2 term in (1).

We neglect the AWGN $w_i(t)$ and loop path delays $\tau_o$ and $\tau_m$ for simplicity. Although the PLL phase detectors make noiseless measurements of the phase errors, the PT section and the microwave VCO driving the SA section in the LO MLL are constrained to effect a control phase of the form $\psi_p(t)=\psi_o(t)+p\psi_m(t)$, which varies only linearly with the comb line index p. In the symmetric CR scheme, the total LO control phase on the p-th comb line will be $$\psi_p(t) = \left(\varphi_o + p_0^2\varphi_2\right) + p\varphi_m,$$

while in the asymmetric CR scheme, the total LO control phase will be $\psi_p(t)=\varphi_o+p(\varphi_m+p_0\varphi_2)$. We find that for $p\in[-p_0,p_0]$, the maximum absolute deviation of the symmetric CR control phase from the true phase noise is $$\varphi_2 p_0^2$$

at p=0, while the maximum absolute deviation of the asymmetric CR control phase from the true phase noise is $$2\varphi_2 p_0^2$$

at $p=-p_0$, which is twice that for the symmetric CR scheme.

While the symmetric CR scheme is superior to the asymmetric CR scheme in use with the MLL comb generator, it may typically not be well-suited for use with the RE-EO comb generator. In the symmetric CR scheme, the loop delay $\tau_o$ in $PLL_o$ includes any time needed for changes in injection current to be seen by the outermost comb lines with indices $p=\pm p_0$. In the MLL comb, adjustments to the PT section injection current affect the frequencies of all comb lines simultaneously. By contrast, in the RE-EO comb, the time delay in frequency shifting seed laser light to the p-th comb line scales as pT, where T is the resonator round-trip time, since the p-th comb line corresponds to light that has traveled p times around the phase-modulated resonator. In one design example, where T=20 ps and $p_0={}^{16}$, the symmetric CR design would add over 300 ps to the loop delay $\tau_o$, degrading the PLL phase-error performance.

V. CONCLUSION

Multi-wavelength analog coherent transceivers using three-section Fabry-Perot MLLs as transmitter and LO comb sources, enabling CR for all wavelengths to be achieved using two optical PLLs, are considered. A symmetric CR scheme outperforms an asymmetric CR scheme in tolerance to optical and microwave phase noises, as well as possible higher-order phase noise.

MLL comb-based links have been compared to analog coherent links using RE-EO combs or arrays of single-wavelength lasers as transmitter and LO sources. The MLL comb-based design offers the lowest overall power consumption, owing to its requirement for only two PLLs and the higher efficiency of the MLL comb compared to the RE-EO comb.

MLL comb-based transceivers are promising candidates for integration in silicon photonics, exploiting rapid advances in heterogeneous integration technologies. Reduced passive optical losses and improved MLL comb flatness may further reduce power consumption. Scaling MLL comb-based links to higher channel counts and higher-order modulation formats will likely require novel solutions to increase the MLL comb span without increasing its optical linewidth.

RE-EO combs, by contrast, benefit from a decoupling of the optical linewidth from the comb-generating structure, facilitating a simultaneous scaling to higher channel counts and higher-order modulation formats. Nevertheless, the power consumption of RE-EO comb-based links is increased by requirements for high microwave modulation power and high seed laser power. Their low-cost implementation will likely require advances in integration of ultra-low-loss EO materials, such as TFLN, in silicon photonics platforms.

APPENDIX A—POWER CONSUMPTION ANALYSIS

The power consumed by active optical components in the Tx and Rx in the three link designs is detailed in Tables IV and V, respectively. These tables are FIGS. 14 and 15, respectively. Each active optical element receives input optical and/or electrical power, and outputs optical power. In the rows labeled "Laser", the seed laser of the RE-EO comb has a wall-plug efficiency (WPE) of 15%. The conversion of seed laser light to the central 25 comb lines has an efficiency of about 30%. Power loss associated with de-interleaving, flattening, and coupling before amplification is estimated as 9.9%. This results in 0.9 mW of optical power at the Tx SOA input and 3.7 mW at the Rx SOA input for the RE-EO comb link, as indicated. The WPE of the MLL laser is estimated as 15%. The power loss associated with de-interleaving, flattening, and coupling before amplification is estimated as 9.9%, similar to the RE-EO comb link. This results in 0.9 mW of optical power at the Tx SOA input and 3.7 mW at the Rx SOA input for the MLL comb link, as indicated. In the laser array-based link, the total laser output power is 65 mW at both the Tx and Rx so the power per channel at the output of the Tx and Rx demultiplexers is the same for all three link designs. The Tx and Rx SOAs have an estimated WPE of 15%. Link losses used to compute the power input and output at each active optical component are consistent with values stated in Table I and used in the SNR calculation in Section III-C.

The power consumed by electrical components in the Tx and Rx in the three link designs is detailed in Tables VI and VII, respectively. These tables are FIGS. 16 and 17, respectively. In the rows labeled "Comb Modulation", the microwave power needed to phase modulate the RE-EO comb is estimated to be 2 W. The microwave power needed to modulate the SA section of the MLL comb in hybrid mode locking is estimated to be 200 mW. In the row labeled "Data Modulation" in Table VI, the IQ modulator is assumed to consume about 8.2 pJ/bit, corresponding to 23.9 W for 13 channels employing DP-QPSK modulation at 56 GBaud. The row labeled "Receiver Chip" in Table VII includes the receiver chain, comprising a transimpedance amplifier (TIA), a variable-gain amplifier (VGA), and an output buffer (OB), as well as the PLL circuitry. Two polarizations are assumed to be used in phase estimation. The power consumption of the receiver chain is estimated to be 330 mW per channel, while that of each PLL circuit is estimated as 370 mW. In comb-based links, each channel requires a receiver chain, but only two PLLs are required. This results in (370 mW×2+330 mW×13)≈5.0 W power consumption for the receiver chip, as indicated in Table VII. In laser array-based links, each channel requires a receiver chain and a PLL. This results in (370 mW×13+330 mW×13)≈9.1 W power consumption for the receiver chip.

The invention claimed is:

1. A coherent optical receiver comprising:
- a local oscillator (LO) that is an optical frequency comb source having three or more distinct receive channels, wherein the receive channels of the LO correspond to transmit channels from a transmitter optical frequency comb source;
- a first analog phase control loop configured to lock an LO optical frequency $f_{oRx}$ to an optical frequency $f_{oTx}$ of the transmitter optical frequency source;
- a second analog phase control loop configured to lock an LO comb spacing frequency $f_{mRx}$ to a comb spacing frequency $f_{mTx}$ of the transmitter optical frequency comb source;
- wherein control signals for the first and second analog phase control loops are derived from a first selected receive channel and a second selected receive channel;
- wherein detection of each transmit channel is coherent homodyne detection using the corresponding receive channel of the LO.

2. The coherent optical receiver of claim 1, wherein a control signal for the first analog phase control loop is a first phase error signal of the first selected receive channel, and wherein a control signal for the second analog phase control loop is a second phase error signal of the second selected receive channel.

3. The coherent optical receiver of claim 1, wherein the first and second selected receive channels provide first and second phase error signals respectively, wherein a control signal for the first analog phase control loop includes a weighted sum of the first phase error signal and the second phase error signal, and wherein a control signal for the second analog phase control loop includes a difference of the first phase error signal and the second phase error signal.

4. The coherent optical receiver of claim 1, wherein the first and second selected receive channels have frequencies that are symmetrically positioned in a frequency range of the receive channels.

5. The coherent optical receiver of claim 1, further comprising a polarization controller corresponding to each receive channel.

6. The coherent optical receiver of claim 5, wherein the first and second selected receive channels have type-A polarization controllers configured to compensate for polarization changes, and wherein all other receive channels have type-B polarization controllers configured to compensate for both polarization changes and static phase shifts.

7. The coherent optical receiver of claim 5, wherein the polarization controllers are disposed in signal paths of the coherent optical receiver, whereby time delay in the polarization controllers does not contribute to loop delays in the first and second analog control loops.

8. The coherent optical receiver of claim 1, wherein the local oscillator is an electro-optic (EO) comb generator including a seed laser and an EO modulator, wherein the first analog phase control loop controls a frequency of the seed laser, and wherein the second analog phase control loop controls a frequency provided to the EO modulator.

9. The coherent optical receiver of claim 1, wherein the local oscillator is a mode-locked laser, wherein the first analog phase control loop controls an optical frequency of the mode-locked laser, and wherein the second analog phase control loop controls a repetition rate of the mode-locked laser.

10. The coherent optical receiver of claim 9, wherein mode locking of the mode-locked laser is active mode locking or hybrid mode locking.

11. The coherent optical receiver of claim 9, wherein the mode-locked laser is a semiconductor mode-locked laser including a gain section, a phase tuning section and a saturable absorber section, wherein the first analog phase control loop controls the optical frequency of the mode-locked laser by providing a control input to the phase tuning section, and wherein the second analog phase control loop controls a frequency provided to the saturable absorber section.

12. The coherent optical receiver of claim 9, wherein the mode-locked laser is a semiconductor mode-locked laser including a gain section and a saturable absorber section, wherein the gain section or the saturable absorber section can also provide phase tuning, wherein the first analog phase control loop controls the optical frequency of the mode-locked laser by providing a control input to the section that provides phase tuning, and wherein the second analog phase control loop controls a frequency provided to the saturable absorber section.

13. The coherent optical receiver of claim 1, wherein the coherent optical receiver is monolithically integrated.

14. The coherent optical receiver of claim 1, wherein the coherent optical receiver is hybridly integrated.

* * * * *